United States Patent
Hasegawa et al.

(10) Patent No.: US 12,052,517 B2
(45) Date of Patent: *Jul. 30, 2024

(54) IMAGING APPARATUS, OPERATION METHOD OF IMAGING APPARATUS, AND PROGRAM

(71) Applicant: FUJIFILM CORPORATION, Tokyo (JP)

(72) Inventors: Ryo Hasegawa, Saitama (JP); Tomoyuki Kawai, Saitama (JP); Hitoshi Sakurabu, Saitama (JP); Makoto Kobayashi, Saitama (JP); Kazufumi Sugawara, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,965

(22) Filed: May 1, 2023

(65) Prior Publication Data

US 2023/0283916 A1 Sep. 7, 2023

Related U.S. Application Data

(63) Continuation of application No. 17/671,529, filed on Feb. 14, 2022, now Pat. No. 11,678,070, which is a
(Continued)

(30) Foreign Application Priority Data

Aug. 29, 2019 (JP) .................... 2019-157260

(51) Int. Cl.
*H04N 23/90* (2023.01)
*H04N 5/265* (2006.01)
(Continued)

(52) U.S. Cl.
CPC ............ *H04N 23/90* (2023.01); *H04N 5/265* (2013.01); *H04N 23/61* (2023.01); *H04N 23/69* (2023.01); *H04N 23/80* (2023.01)

(58) Field of Classification Search
CPC ........ H04N 23/90; H04N 5/265; H04N 23/61; H04N 23/69; H04N 23/80; H04N 23/45;
(Continued)

(56) References Cited

U.S. PATENT DOCUMENTS 9,357,203 B2 * 5/2016 Ohba ................... H04N 13/156
10,609,273 B2 * 3/2020 Shimizu ................ H01L 21/00
(Continued)

FOREIGN PATENT DOCUMENTS

CN 101616237 A 12/2009
CN 106993139 A 7/2017
(Continued)

OTHER PUBLICATIONS

International Search Report issued in International Application No. PCT/JP2020/026024 on Sep. 29, 2020.
(Continued)

*Primary Examiner* — Chiawei Chen
(74) *Attorney, Agent, or Firm* — SOLARIS Intellectual Property Group, PLLC

(57) ABSTRACT

An imaging apparatus includes a first imaging element and a second imaging element. The second imaging element includes a storage portion that stores first image data output from the first imaging element, and a processing portion that processes second image data. A second image indicated by the second image data has a higher resolution than a first image indicated by the first image data. The second imaging element outputs the first image data stored in the storage portion to a specific output destination in a case where a specific subject image is not detected, and outputs the
(Continued)

second image data or combined image data obtained by combining the first image data with the second image data using the processing portion to the output destination in a case where the specific subject image is detected.

14 Claims, 23 Drawing Sheets

Related U.S. Application Data continuation of application No. PCT/JP2020/026024, filed on Jul. 2, 2020.

(51) Int. Cl.
*H04N 23/61* (2023.01)
*H04N 23/69* (2023.01)
*H04N 23/80* (2023.01)

(58) Field of Classification Search
CPC ........ H04N 25/50; H04N 25/70; G03B 15/00; G03B 19/07
See application file for complete search history.

(56) References Cited

U.S. PATENT DOCUMENTS

| | | | |
|---|---|---|---|
| 11,132,539 B2 * | 9/2021 | Asayama | G06T 7/73 |
| RE49,245 E * | 10/2022 | Kim | G06F 3/0412 |
| 11,823,493 B2 * | 11/2023 | Watanabe | H04N 23/63 |
| 2002/0171744 A1 * | 11/2002 | Kaku | H04N 23/632 |
| | | | 348/222.1 |
| 2003/0020814 A1 | 1/2003 | Ono | |
| 2009/0322891 A1 | 12/2009 | Kondo et al. | |
| 2009/0324135 A1 | 12/2009 | Kondo et al. | |
| 2012/0218227 A1 * | 8/2012 | Ohashi | G06F 3/042 |
| | | | 345/175 |
| 2013/0162876 A1 | 6/2013 | Song et al. | |
| 2015/0326784 A1 * | 11/2015 | Hayashi | H04N 25/443 |
| | | | 348/220.1 |
| 2016/0071243 A1 * | 3/2016 | Kim | G06T 5/001 |
| | | | 382/305 |
| 2017/0150094 A1 * | 5/2017 | Miyamoto | H04N 9/8205 |
| 2018/0032547 A1 * | 2/2018 | Suzuki | G16H 30/20 |
| 2019/0199898 A1 * | 6/2019 | Yonishi | H04N 7/183 |
| 2020/0112705 A1 | 4/2020 | Yokokawa et al. | |
| 2021/0049394 A1 * | 2/2021 | Nakatani | G06V 30/412 |
| 2021/0168308 A1 * | 6/2021 | Hasegawa | G06T 7/254 |

FOREIGN PATENT DOCUMENTS

| | | |
|---|---|---|
| JP | 2002-262159 A | 9/2002 |
| JP | 2003-37757 A | 2/2003 |
| JP | 2010-011223 A | 1/2010 |
| JP | 2012-129590 A | 7/2012 |
| JP | 2014-176056 A | 9/2014 |
| JP | 2017-98791 A | 6/2017 |
| JP | 2019-118043 A | 7/2019 |
| KR | 10-2013-0071793 A | 7/2013 |
| WO | 2018/179671 A1 | 10/2018 |

OTHER PUBLICATIONS

Written Opinion of the ISA issued in International Application No. PCT/JP2020/026024 on Sep. 29, 2020.
Notice of Allowance issued by USPTO on Feb. 7, 2023 in related U.S. Appl. No. 17/671,529.
English language translation of the following: Office action dated Mar. 16, 2024 from the SIPO in a Chinese patent application No. 202080058927.4 corresponding to the instant patent application. This office action translation is submitted now in order to supplement the understanding of the cited references which are being disclosed in the instant Information Disclosure Statement.

\* cited by examiner

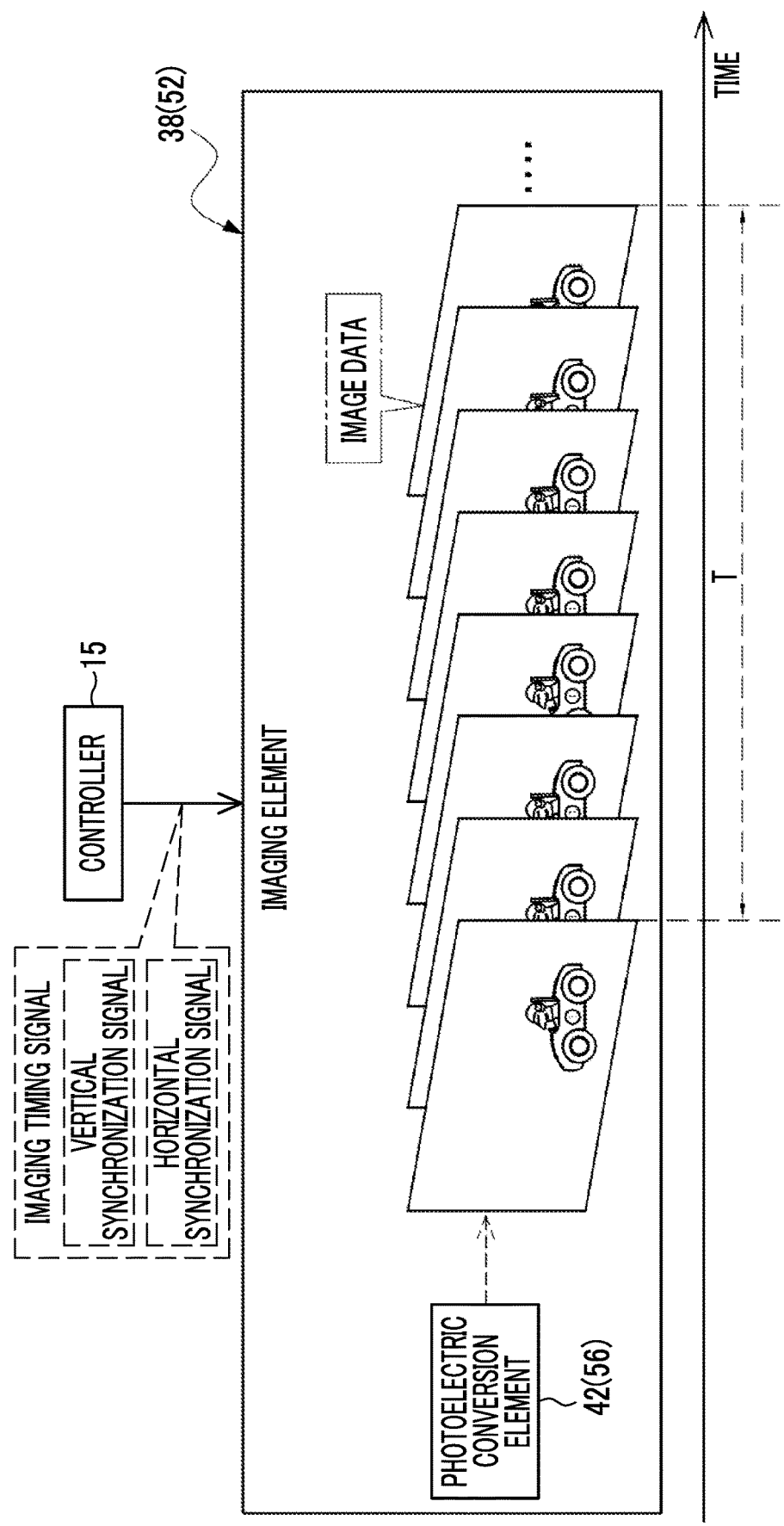

FIG. 11
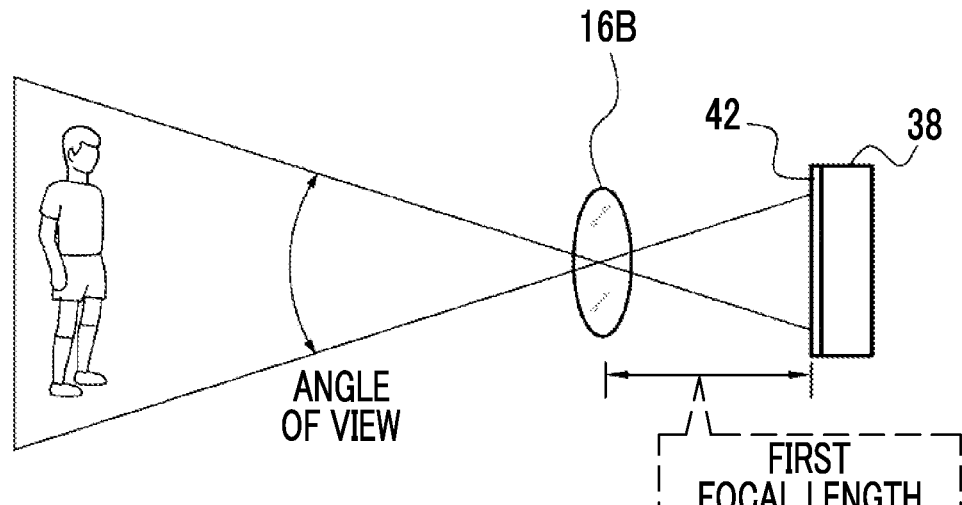
[IMAGING USING FIRST IMAGING APPARATUS]
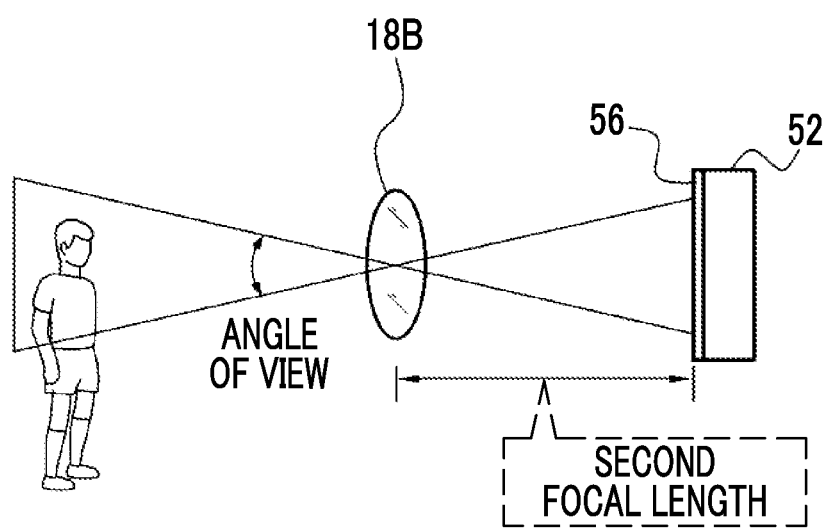
[IMAGING USING SECOND IMAGING APPARATUS]

IMAGING APPARATUS, OPERATION METHOD OF IMAGING APPARATUS, AND PROGRAM

CROSS-REFERENCE TO RELATED APPLICATIONS

This application is a continuation application of U.S. Ser. No. 17/671,529, filed on Feb. 14, 2022, which is a continuation application of International Application No. PCT/JP2020/026024, filed on Jul. 2, 2020. Further, this application claims priority from Japanese Patent Application No. 2019-157260, filed on Aug. 29, 2019. The entire disclosure of each of the applications above is incorporated herein by reference in its entirety.

BACKGROUND

1. Technical Field

The technology of the present disclosure relates to an imaging apparatus, an operation method of an imaging apparatus, and a program.

2. Related Art

JP2014-176056A discloses an imaging apparatus comprising an imaging optical system, a directional sensor, an image reading device, and an image generation device. The imaging optical system is configured with a central optical system that is a central portion, and an annular optical system that is an edge part portion and has a shorter focal length than the central optical system. The annular optical system forms a first image that lacks of a central portion on an image forming plane, and the central optical system forms a second image including the lacking first image on the image forming plane. The directional sensor is a directional sensor that is arranged at an image forming position of the imaging optical system and includes a plurality of pixels configured with two-dimensionally arranged photoelectric conversion elements. The plurality of pixels selectively receive each luminous flux incident through the annular optical system and the central optical system in a pupil splitting manner. The image reading device acquires each of the first image that lacks of the central portion and is received through the annular optical system, and the second image received through the central optical system from the directional sensor. The image generation device generates an image by combining the second image to fit into a region of the central portion of the first image by adjusting enlargement/reduction rates of the first image and the second image acquired by the image reading device.

JP2002-262159A discloses an imaging apparatus comprising a single or a plurality of spectroscopic units that are arranged on an optical path of an imaging optical system and can control characteristics of a spectroscopic ratio between a transmittance rate and a reflectance rate, and a plurality of imaging units that separately capture a subject image using the spectroscopic unit and input the subject image using electric charge accumulation based on photoelectric conversion. The plurality of imaging units perform imaging at imaging angles of view different from each other.

SUMMARY

One embodiment according to the technology of the present disclosure provides an imaging apparatus, an operation method of an imaging apparatus, and a program that can perform detection processing of detecting a specific subject image with high accuracy and output image data indicating an image of a resolution appropriate for a detection result of the detection processing to a specific output destination, compared to a case where first image data output from a first imaging element is output to the specific output destination at all times regardless of the detection result obtained by performing the detection processing of detecting the specific subject image using only an image of a constant resolution indicated by the first image data as a detection target.

A first aspect according to the technology of the present disclosure is an imaging apparatus comprising a first imaging element that outputs first image data obtained by imaging a subject to a rear stage imaging element, and a second imaging element that is disposed as the rear stage imaging element and includes a storage portion which stores the first image data output from the first imaging element, and a processing portion which processes second image data obtained by imaging the subject using the second imaging element, in which a second image indicated by the second image data has a higher resolution than a first image indicated by the first image data, the processing portion performs detection processing of detecting a specific subject image indicating a specific subject from the second image, and the second imaging element outputs the first image data stored in the storage portion to a specific output destination in a case where the specific subject image is not detected by the detection processing, and outputs the second image data or combined image data obtained by combining the first image data with the second image data using the processing portion to the output destination in a case where the specific subject image is detected by the detection processing.

A second aspect according to the technology of the present disclosure is the imaging apparatus according to the first aspect, in which imaging ranges of the first imaging element and the second imaging element overlap with each other.

A third aspect according to the technology of the present disclosure is the imaging apparatus according to the first or second aspect, in which the first image data is first focal length image data obtained by imaging performed by the first imaging element with a first focal length out of the first focal length and a second focal length longer than the first focal length, and the second image data is second focal length image data obtained by imaging performed by the second imaging element with the second focal length.

A fourth aspect according to the technology of the present disclosure is the imaging apparatus according to the third aspect, in which the second focal length is changed by an optical zoom mechanism.

A fifth aspect according to the technology of the present disclosure is the imaging apparatus according to any one of the first to fourth aspects, in which the second imaging element performs imaging of which an exposure amount is changeable for each frame.

A sixth aspect according to the technology of the present disclosure is the imaging apparatus according to any one of the first to fifth aspects, in which the first imaging element includes a first photoelectric conversion element on which an image of first subject light is formed, the second imaging element includes a second photoelectric conversion element on which an image of second subject light is formed, the first image data is image data obtained from a first region designated in the first photoelectric conversion element, the second image data is image data obtained from a second region designated in the second photoelectric conversion element, and the second region is a region wider than the first region.

A seventh aspect according to the technology of the present disclosure is the imaging apparatus according to any one of the first to sixth aspects, further comprising a reception portion that receives a request for output of the second image data, in which in a case where the request is received by the reception portion, the second imaging element outputs the second image data to the output destination regardless of a detection result of the detection processing.

An eighth aspect according to the technology of the present disclosure is the imaging apparatus according to any one of the first to seventh aspects, in which a frame rate of the second imaging element is higher than a frame rate of the first imaging element.

A ninth aspect according to the technology of the present disclosure is the imaging apparatus according to any one of the first to eighth aspects, in which the second imaging element is an imaging element in which at least a photoelectric conversion element and the storage portion are formed in one chip.

A tenth aspect according to the technology of the present disclosure is the imaging apparatus according to the ninth aspect, in which the second imaging element is a laminated imaging element in which the photoelectric conversion element is laminated with the storage portion.

An eleventh aspect according to the technology of the present disclosure is the imaging apparatus according to any one of the first to tenth aspects, in which the first imaging element, the second imaging element, and the output destination are connected in series, and the first imaging element outputs the first image data to the second imaging element.

A twelfth aspect according to the technology of the present disclosure is the imaging apparatus according to any one of the first to eleventh aspects, further comprising a control portion that performs at least one of a control for displaying at least one of an image based on the first image data output by the second imaging element or an image based on the second image data or the combined image data output by the second imaging element on a display portion, or a control for storing at least one of the first image data output by the second imaging element or the second image data or the combined image data output by the second imaging element in a storage device.

A thirteenth aspect according to the technology of the present disclosure is an operation method of an imaging apparatus, the operation method comprising outputting first image data obtained by imaging a subject using a first imaging element included in the imaging apparatus to a rear stage imaging element by the first imaging element, storing the first image data output from the first imaging element in a storage portion included in a second imaging element disposed in the imaging apparatus as the rear stage imaging element, processing second image data obtained by imaging the subject using the second imaging element, performing detection processing of detecting a specific subject image indicating a specific subject from a second image indicated by the second image data by the second imaging element, outputting the first image data stored in the storage portion to a specific output destination by the second imaging element in a case where the specific subject image is not detected by the detection processing, and outputting the second image data or combined image data obtained by combining the first image data with the second image data to the output destination by the second imaging element in a case where the specific subject image is detected by the detection processing, in which the second image has a higher resolution than a first image indicated by the first image data.

A fourteenth aspect according to the technology of the present disclosure is a program causing a computer applied to an imaging apparatus to execute a process comprising outputting first image data obtained by imaging a subject using a first imaging element included in the imaging apparatus to a rear stage imaging element by the first imaging element, storing the first image data output from the first imaging element in a storage portion included in a second imaging element disposed in the imaging apparatus as the rear stage imaging element, processing second image data obtained by imaging the subject using the second imaging element, performing detection processing of detecting a specific subject image indicating a specific subject from a second image indicated by the second image data by the second imaging element, outputting the first image data stored in the storage portion to a specific output destination by the second imaging element in a case where the specific subject image is not detected by the detection processing, and outputting the second image data or combined image data obtained by combining the first image data with the second image data to the output destination by the second imaging element in a case where the specific subject image is detected by the detection processing, in which the second image has a higher resolution than a first image indicated by the first image data.

BRIEF DESCRIPTION OF THE DRAWINGS

Exemplary embodiments of the technology of the disclosure will be described in detail based on the following figures, wherein:

FIG. 5A is a conceptual diagram for describing an imaging frame rate of an imaging element included in the imaging apparatus according to the embodiment;

FIG. 11 is a conceptual diagram illustrating an example of an aspect of imaging performed by a first imaging apparatus and an example of an aspect of imaging performed by a second imaging apparatus;

DETAILED DESCRIPTION

Figure 1:
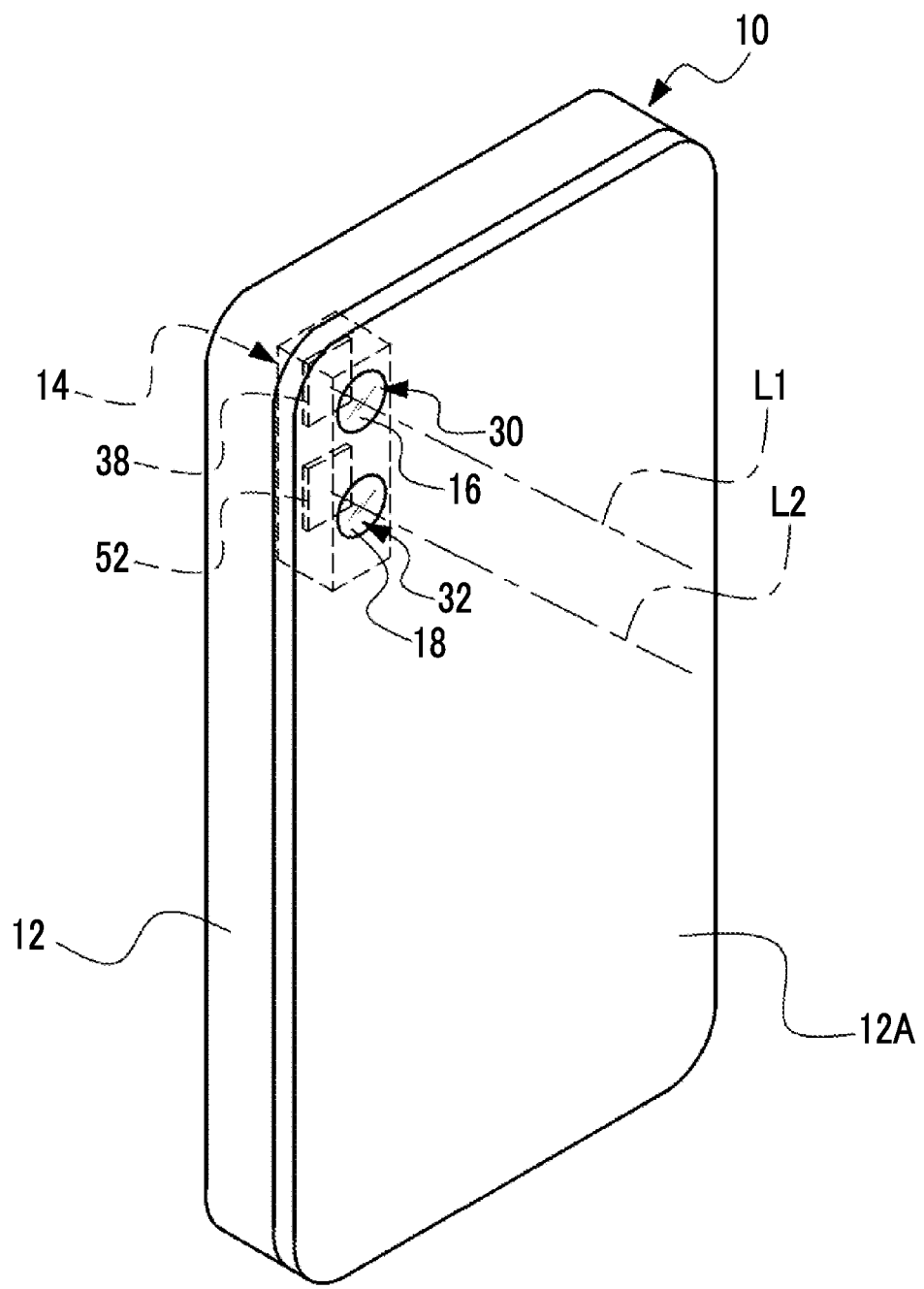
FIG. 1 is a perspective rear view illustrating an example of an exterior on a rear surface side of a smart device according to an embodiment.

Hereinafter, an example of an embodiment of an imaging apparatus according to the embodiment of the technology of the present disclosure will be described in accordance with the appended drawings.

First, words used in the following description will be described.

The abbreviation CPU stands for "Central Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory". The abbreviation LSI stands for "Large-Scale Integrated circuit". The abbreviation ASIC stands for "Application Specific Integrated Circuit". The abbreviation PLD stands for "Programmable Logic Device". The abbreviation FPGA stands for "Field-Programmable Gate Array". The abbreviation SoC stands for "System-on-a-chip". The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory". The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation LVDS stands for "Low Voltage Differential Signaling". The abbreviation PCIe stands for "Peripheral Component Interconnect Express". The abbreviation SATA stands for "Serial Advanced Technology Attachment". The abbreviation SLVS-EC stands for "Scalable Low Signaling with Embedded Clock". The abbreviation MIPI (registered trademark) stands for "Mobile Industry Processor Interface". The abbreviation LTE stands for "Long Term Evolution". The abbreviation 5G stands for "5th Generation".

In the description of the present specification, "perpendicular" refers to being perpendicular in a sense of not only being completely perpendicular but also including an error generally allowed in the technical field to which the technology of the present disclosure belongs. In the description of the present specification, "horizontal" refers to being horizontal in a sense of not only being completely horizontal but also including an error generally allowed in the technical field to which the technology of the present disclosure belongs. In the description of the present specification, "vertical" refers to being vertical in a sense of not only being completely vertical but also including an error generally allowed in the technical field to which the technology of the present disclosure belongs. In the description of the present specification, "same" refers to being the same in a sense of not only being completely the same but also including an error generally allowed in the technical field to which the technology of the present disclosure belongs.

As illustrated in FIG. 1 as an example, a smart device 10 comprises a housing 12, and an imaging apparatus 14 is accommodated in the housing 12. For example, a smartphone or a tablet terminal that is an electronic apparatus having an imaging function is exemplified as the smart device 10.

The imaging apparatus 14 comprises a first imaging apparatus 30 and a second imaging apparatus 32. The first imaging apparatus 30 comprises a first imaging lens 16 and a first imaging element 38. The second imaging apparatus 32 comprises a second imaging lens 18 and a second imaging element 52. Hereinafter, for convenience of description, the first imaging element 38 and the second imaging element 52 will be referred to as the "imaging element" without the reference signs unless otherwise necessary to distinguish therebetween.

In an upper left portion of a rear surface 12A of the housing 12 in a case where the smart device 10 is in a vertically placed state (upper left portion of the smart device 10 in a vertically placed state in a rear view), the first imaging lens 16 and the second imaging lens 18 are arranged at predetermined intervals (for example, intervals of a few millimeters) in a perpendicular direction and are exposed from the rear surface 12A. A center of the first imaging lens 16 is positioned on an optical axis L1. A center of the second imaging lens 18 is positioned on an optical axis L2.

The first imaging lens 16 is arranged in front (object side) of the first imaging element 38. The first imaging lens 16 acquires subject light showing a subject (hereinafter, simply referred to as the "subject light") and forms an image of the acquired subject light on the first imaging element 38. The second imaging lens 18 is arranged in front (object side) of the second imaging element 52. The second imaging lens 18 acquires the subject light and forms the image of the acquired subject light on the second imaging element 52.

Figure 2:
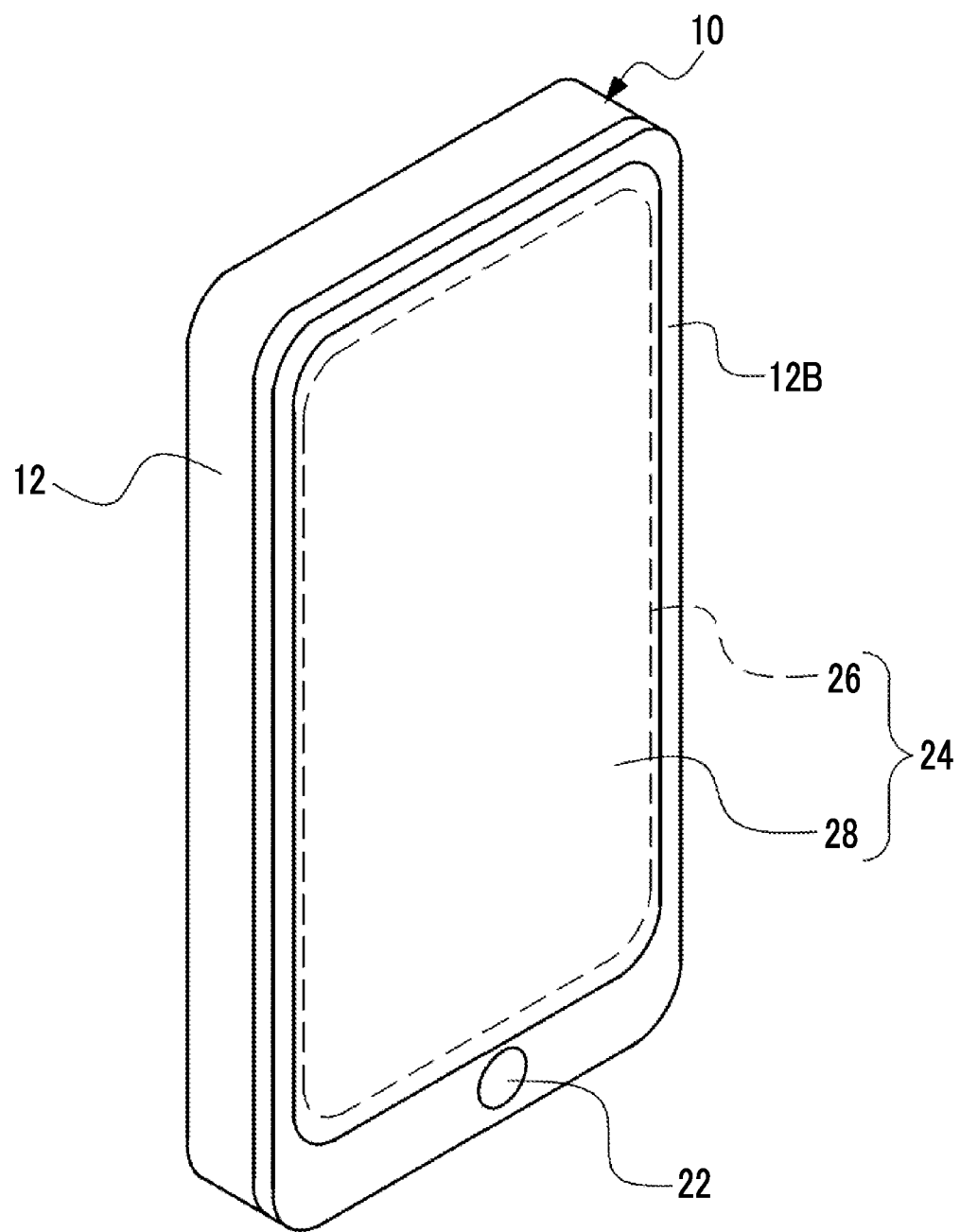
FIG. 2 is a perspective front view illustrating an example of the exterior on a front surface side of the smart device illustrated in FIG. 1.

As illustrated in FIG. 2 as an example, an instruction key 22 and a touch panel display 24 are disposed on a front surface 12B of the housing 12. In a lower portion of the front surface 12B in a case where the smart device 10 is in a vertically placed state, the instruction key 22 is arranged, and the touch panel display 24 is arranged above the instruction key 22. In the present embodiment, while the instruction key 22 is disposed separately from the touch panel display 24, the instruction key 22 may be a virtual instruction key on the touch panel display 24.

The instruction key 22 receives various instructions. For example, the "various instructions" here refer to an instruction to display an unlock reception screen, an instruction to display a menu screen on which various menus can be selected, an instruction to select one or a plurality of menus, an instruction to confirm a selected content, and an instruction to delete the selected content. The unlock reception screen refers to a screen on which a password for unlocking the smart device 10 is received.

Figure 4:
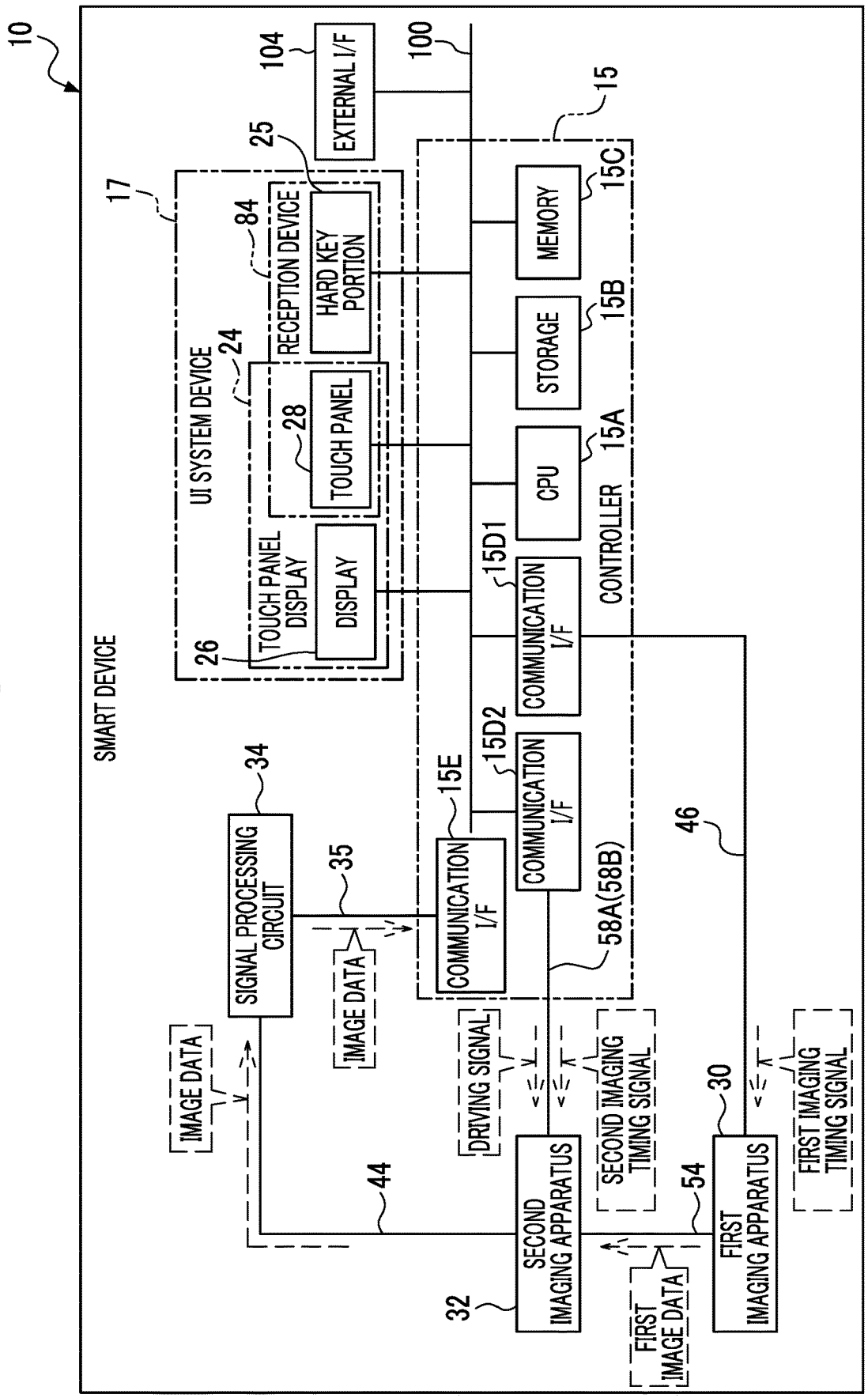
FIG. 4 is a block diagram illustrating an example of a configuration of the smart device according to the embodiment.

The touch panel display 24 comprises a display 26 and a touch panel 28 (refer to FIG. 4). An organic EL display is exemplified as an example of the display 26. Instead of the organic EL display, the display 26 may be a display of other types such as a liquid crystal display or an inorganic EL display. The display 26 is an example of a "display portion (display)" according to the embodiment of the technology of the present disclosure.

The display 26 displays images, text information, and the like. The display 26 is used for displaying a live view image obtained by consecutive imaging using the imaging element. In addition, the display 26 is used for displaying a still picture image and/or a motion picture image. Furthermore, the display 26 is used for displaying a playback image and displaying a menu screen and the like.

The touch panel 28 is a transmissive touch panel and is overlaid on a surface of a display region of the display 26. The touch panel 28 receives an instruction from a user by detecting a contact of an instruction object such as a finger or a stylus pen.

Here, while an out-cell touch panel display in which the touch panel 28 is overlaid on the surface of the display region of the display 26 is exemplified as an example of the touch panel display 24, the out-cell touch panel display is merely an example. For example, an on-cell or in-cell touch panel display can also be applied as the touch panel display 24.

Figure 3:
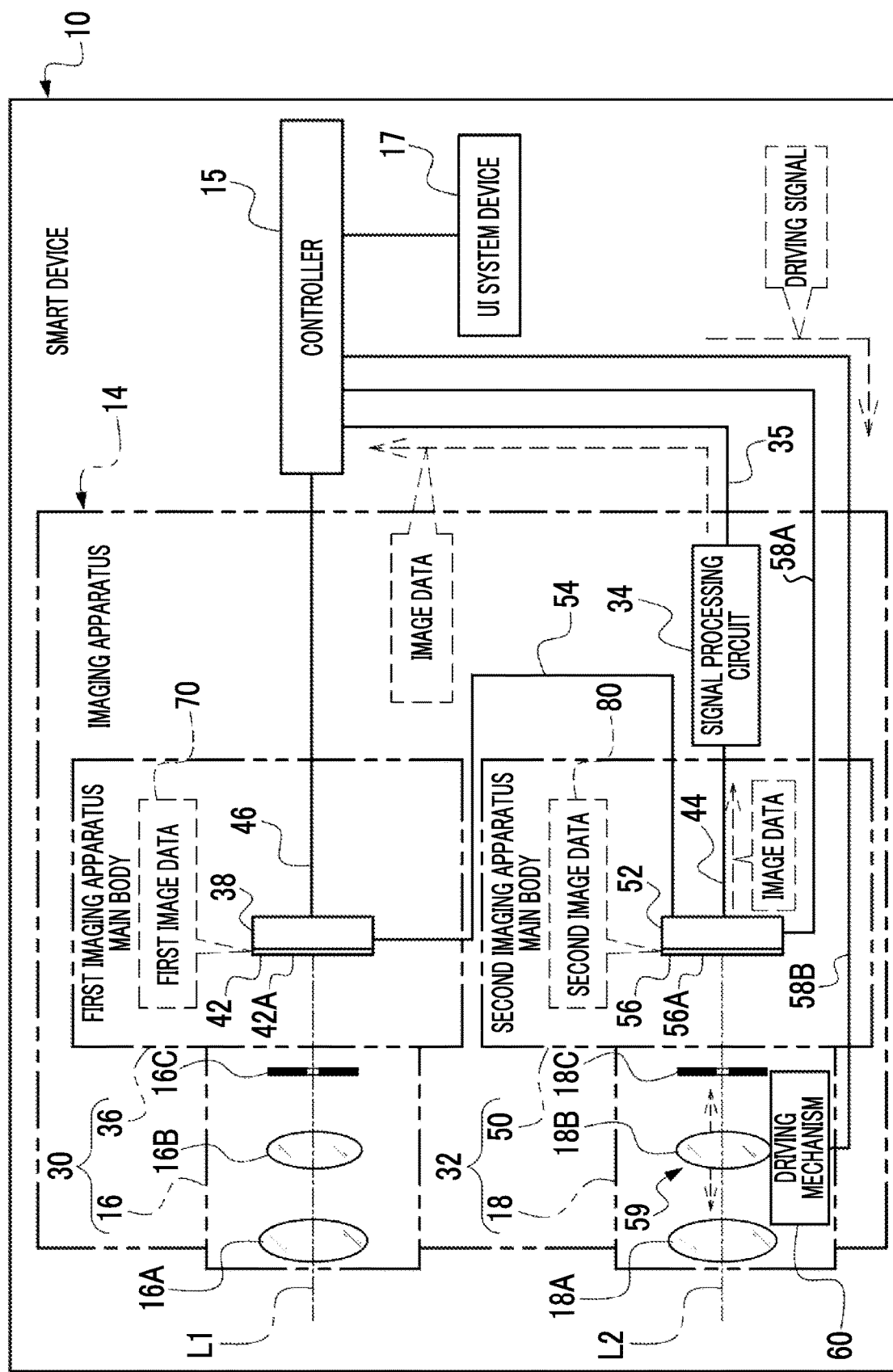
FIG. 3 is a block diagram illustrating an example of a configuration of an imaging apparatus included in the smart device according to the embodiment.

As illustrated in FIG. 3 as an example, the smart device 10 comprises a controller 15 and a UI system device 17 in addition to the imaging apparatus 14. The controller 15 controls the entire smart device 10. The UI system device 17 is a device that presents information to the user or receives the instruction from the user. The controller 15 acquires various types of information from the UI system device 17 and controls the UI system device 17.

The first imaging apparatus 30 comprises a first imaging apparatus main body 36 in addition to the first imaging lens 16. The first imaging lens 16 is arranged in front (object side) of the first imaging apparatus main body 36.

The first imaging apparatus main body 36 comprises the first imaging element 38. The first imaging element 38 comprises a photoelectric conversion element 42 having a light receiving surface 42A. In the present embodiment, the first imaging element 38 is a CMOS image sensor. In addition, here, while the CMOS image sensor is illustrated as the first imaging element 38, the technology of the present disclosure is not limited thereto. For example, the technology of the present disclosure is also established in a case where the first imaging element 38 is an image sensor of other types such as a CCD image sensor.

The first imaging lens 16 comprises an objective lens 16A, an image forming lens 16B, and a stop 16C. The objective lens 16A, the image forming lens 16B, and the stop 16C are arranged in an order of the objective lens 16A, the image forming lens 16B, and the stop 16C along the optical axis L1 from a subject side (object side) to a light receiving surface 42A side (image side). Here, a fixed stop of which an opening does not change is employed as an example of the stop 16C. In a case where the stop 16C is the fixed stop, exposure adjustment is performed by an electronic shutter of the first imaging element 38. The stop 16C may be a variable stop instead of the fixed stop. The objective lens 16A, the image forming lens 16B, and the stop 16C included in the first imaging lens 16 are merely an example. The technology of the present disclosure is also established in a case where configurations of the lenses and/or a position of the stop 16C changes.

The subject light is transmitted through the first imaging lens 16, and the image of the subject light is formed on the light receiving surface 42A. The first imaging element 38 images the subject by receiving the subject light on the light receiving surface 42A and photoelectrically converting the received subject light using the photoelectric conversion element 42. The first imaging element 38 is connected to the controller 15 through a communication line 46 and generates first image data indicating the image of the subject by imaging the subject in accordance with an instruction from the controller 15. Here, the photoelectric conversion element 42 is an example of a "first photoelectric conversion element" according to the embodiment of the technology of the present disclosure. The subject light of which the image is formed on the photoelectric conversion element 42 is an example of "first subject light" according to the embodiment of the technology of the present disclosure.

Meanwhile, the second imaging apparatus 32 comprises a second imaging apparatus main body 50 in addition to the second imaging lens 18. The second imaging lens 18 is arranged in front (object side) of the second imaging apparatus main body 50.

The second imaging apparatus main body 50 comprises the second imaging element 52. The second imaging element 52 comprises a photoelectric conversion element 56 having a light receiving surface 56A. In the present embodiment, the second imaging element 52 is a CMOS image sensor. In addition, here, while the CMOS image sensor is illustrated as the second imaging element 52, the technology of the present disclosure is not limited thereto. For example, the technology of the present disclosure is also established in a case where the second imaging element 52 is an image sensor of other types such as a CCD image sensor.

The second imaging lens 18 comprises an objective lens 18A, a zoom lens 18B, and a stop 18C. The objective lens 18A, the zoom lens 18B, and the stop 18C are arranged in an order of the objective lens 18A, the zoom lens 18B, and the stop 18C along the optical axis L2 from the subject side (object side) to a light receiving surface 56A side (image side). The zoom lens 18B operates by receiving motive power from a driving source (not illustrated) such as a motor. That is, the zoom lens 18B moves along the optical axis L2 in response to the provided motive power. Here, a fixed stop of which an opening does not change is employed as an example of the stop 18C. In a case where the stop 18C is the fixed stop, the exposure adjustment is performed by an electronic shutter of the second imaging element 52. The stop 18C may be a variable stop instead of the fixed stop. The objective lens 18A, the zoom forming lens 18B, and the stop 18C included in the second imaging lens 18 are merely an example. The technology of the present disclosure is also established in a case where configurations of the lenses and/or a position of the stop 18C changes.

The subject light is transmitted through the second imaging lens 18, and the image of the subject light is formed on the light receiving surface 56A. The second imaging element 52 images the subject by receiving the subject light on the light receiving surface 56A and photoelectrically converting the received subject light using the photoelectric conversion element 56. The second imaging element 52 is connected to the controller 15 through a communication line 58A and generates second image data indicating the image of the subject by imaging the subject in accordance with the instruction from the controller 15. Here, the photoelectric conversion element 56 is an example of a "second photoelectric conversion element" according to the embodiment of the technology of the present disclosure. The subject light of which the image is formed on the photoelectric conversion element 56 is an example of "second subject light" according to the embodiment of the technology of the present disclosure.

Hereinafter, for convenience of description, the light receiving surfaces 42A and 56A will be referred to as the "light receiving surface" without the reference signs unless otherwise necessary to distinguish therebetween. Furthermore, hereinafter, for convenience of description, the photoelectric conversion elements 42 and 56 will be referred to as the "photoelectric conversion element" without the reference signs unless otherwise necessary to distinguish therebetween.

The first imaging element 38 is connected to the second imaging element 52 through a communication line 54. A signal processing circuit 34 is positioned on a rear stage of the second imaging element 52. The second imaging element 52 is connected to the signal processing circuit 34 through a communication line 44. That is, the first imaging element 38, the second imaging element 52, and the signal processing circuit 34 are connected in series. The second imaging element 52 is an example of a "rear stage imaging element" according to the embodiment of the technology of the present disclosure. The signal processing circuit 34 is an example of a "specific output destination" according to the embodiment of the technology of the present disclosure.

As will be described in detail later, the first imaging element 38 outputs the first image data obtained by imaging the subject to the second imaging element 52, and the second imaging element 52 receives the first image data from the first imaging element 38. The signal processing circuit 34 is connected to the controller 15 through a communication line 35. The second imaging element 52 outputs image data to the signal processing circuit 34. In the examples illustrated in FIG. 3, FIG. 4, FIG. 5A, and FIG. 5B, the "image data" collectively refers to image data based on the first image data and the second image data obtained by imaging the subject using the second imaging element 52.

The signal processing circuit 34 is an LSI, specifically, a device including an ASIC and an FPGA. The signal processing circuit 34 performs various types of signal processing on the image data input from the second imaging element 52. The various types of signal processing performed by the signal processing circuit 34 include well-known signal processing such as white balance adjustment, sharpness adjustment, gamma correction, color space conversion processing, and color difference correction.

The signal processing circuit 34 is connected to the controller 15 through the communication line 35. The image data on which the various types of signal processing are performed is output to the controller 15 by the signal processing circuit 34.

In the present embodiment, while the device including the ASIC and the FPGA is illustrated as the signal processing circuit 34, the technology of the present disclosure is not limited thereto. For example, the signal processing circuit 34 may be a device including an ASIC, an FPGA, or a PLD, a device including an FPGA and a PLD, or a device including an ASIC and a PLD.

In addition, the signal processing circuit 34 may be a computer including a CPU, a storage, and a memory. Here, the storage refers to a non-volatile storage device. Various non-volatile memories such as a magnetoresistive memory and/or a ferroelectric memory are exemplified as an example of the non-volatile storage device instead of a flash memory or together with the flash memory. In addition, the non-volatile storage device may be an EEPROM, an HDD, and/or an SSD or the like. In addition, the memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the signal processing circuit 34 may be implemented by a combination of a hardware configuration and a software configuration.

The second imaging lens 18 comprises an optical zoom mechanism 59. The optical zoom mechanism 59 includes the zoom lens 18B and a driving mechanism 60. The zoom lens 18B is attached to the driving mechanism 60, and the driving mechanism 60 drives the zoom lens 18B. The driving mechanism 60 is connected to the controller 15 through a communication line 58B and operates in accordance with the instruction from the controller 15. The driving mechanism 60 comprises a sliding mechanism (not illustrated), a motor (not illustrated), and a driver (not illustrated). The driver is connected to the controller 15 through the communication line 58B. The controller 15 outputs a driving signal to the driver. The driving signal is a signal for controlling driving of the motor. The driver drives the motor in accordance with the driving signal input from the controller 15. The sliding mechanism supports the zoom lens 18B and causes the zoom lens 18B to slide along the optical axis L2 by receiving motive power of the motor. Accordingly, the optical zoom mechanism 59 changes a focal length by causing the zoom lens 18B to slide along the optical axis L2 under control of the controller 15. An angle of view of the second imaging apparatus 32 is adjusted by changing the focal length. The illustration of an edge part around the optical zoom mechanism 59, the driving mechanism 60, and the like is merely a conceptual diagram. The optical zoom mechanism 59 has various configurations.

As illustrated in FIG. 4 as an example, the controller 15 comprises a CPU 15A, a storage 15B, and a memory 15C. In addition, the controller 15 comprises communication I/Fs 15D1, 15D2, and 15E. The CPU 15A is an example of a "control portion (processor)" according to the embodiment of the technology of the present disclosure.

The CPU 15A, the storage 15B, the memory 15C, the communication I/F 15D1, the communication I/F 15D2, and the communication I/F 15E are connected through a bus 100. In the example illustrated in FIG. 4, while one bus is illustrated as the bus 100 for convenience of illustration, a plurality of buses may be used. The bus 100 may be a serial bus or may be a parallel bus including a data bus, an address bus, a control bus, and the like.

The storage 15B stores various parameters and various programs. The storage 15B is a non-volatile storage device. Here, a flash memory is employed as an example of the storage 15B. The flash memory is merely an example. Various non-volatile memories such as a magnetoresistive memory and/or a ferroelectric memory are exemplified instead of the flash memory or together with the flash memory. In addition, the non-volatile storage device may be an EEPROM, an HDD, and/or an SSD or the like. In addition, the memory 15C temporarily stores various types of information and is used as a work memory. A RAM is exemplified as an example of the memory 15C. However, the technology of the present disclosure is not limited thereto. A storage device of other types may be used.

The storage 15B stores various programs. The CPU 15A reads out a necessary program from the storage 15B and executes the read program on the memory 15C. The CPU 15A controls the entire smart device 10 in accordance with the program executed on the memory 15C.

The communication I/F 15D1 is connected to the first imaging apparatus 30 through the communication line 46 and controls exchange of various types of information between the first imaging apparatus 30 and the CPU 15A. The CPU 15A controls the first imaging apparatus 30 through the communication I/F 15D1. For example, the CPU 15A controls a timing of imaging performed by the first imaging element 38 by supplying a first imaging timing signal for defining the timing of imaging to the first imaging element 38 through the communication I/F 15D1.

The communication I/F 15D2 is connected to the second imaging apparatus 32 through the communication lines 58A and 58B and controls exchange of various types of information between the second imaging apparatus 32 and the CPU 15A. The CPU 15A controls the second imaging apparatus 32 through the communication I/F 15D2. For example, the CPU 15A controls a timing of imaging performed by the second imaging element 52 by supplying a second imaging timing signal for defining the timing of imaging to the second imaging element 52 through the communication I/F 15D2. In addition, the CPU 15A controls an operation of the driving mechanism 60 by supplying the driving signal to the driving mechanism 60 through the communication I/F 15D2.

Hereinafter, the first imaging timing signal and the second imaging timing signal will be referred to as the "imaging timing signal" unless otherwise necessary to distinguish therebetween.

The communication I/F 15E is connected to the signal processing circuit 34 through the communication line 35 and controls exchange of various types of information between the signal processing circuit 34 and the CPU 15A. The signal processing circuit 34 is controlled by the CPU 15A through the communication I/F 15E. The image data on which the various types of signal processing are performed by the signal processing circuit 34 under control of the CPU 15A is output to the communication I/F 15E by the signal processing circuit 34. The communication I/F 15E receives the image data output from the signal processing circuit 34 and transfers the received image data to the CPU 15A.

An external I/F 104 is connected to the bus 100. The external I/F 104 is a communication device of which at least a part is configured with a circuit. Here, while the device of which at least the part is configured with the circuit is illustrated as the external I/F 104, the device is merely an example. The external I/F 104 may be a device including an ASIC, an FPGA, and/or a PLD. In addition, the external I/F 104 may be implemented by a combination of a hardware configuration and a software configuration.

A USB interface is exemplified as an example of the external I/F 104. An external apparatus (not illustrated) such as a smart device, a personal computer, a server, a USB memory, a memory card, and/or a printer can be directly or indirectly connected to the USB interface. The external I/F 104 controls exchange of various types of information between the CPU 15A and the external apparatus.

The UI system device 17 comprises the touch panel display 24 and a reception device 84. The display 26 and the touch panel 28 are connected to the bus 100. Accordingly, the CPU 15A displays various types of information on the display 26 and operates in accordance with various instructions received by the touch panel 28. The reception device 84 comprises a hard key portion 25. The hard key portion 25 is at least one hard key including the instruction key 22 (refer to FIG. 2). The hard key portion 25 is connected to the bus 100, and the CPU 15A acquires an instruction received by the hard key portion 25 and operates in accordance with the acquired instruction. The hard key portion 25 may be configured to be connected to the external I/F 104.

The smart device 10 has a communication function such as LTE, 5G a wireless LAN, and/or Bluetooth (registered trademark).

As illustrated in FIG. 5A as an example, the imaging timing signal is input into the imaging element from the controller 15. The imaging timing signal includes a vertical synchronization signal and a horizontal synchronization signal. The vertical synchronization signal is a synchronization signal for defining a start timing of reading of the image data for each frame from the photoelectric conversion element. The horizontal synchronization signal is a synchronization signal for defining a start timing of reading of the image data for each horizontal line from the photoelectric conversion element.

In the imaging element, the image data is read out from the photoelectric conversion element at an imaging frame rate decided in accordance with the vertical synchronization signal input from the controller 15. In addition, in the imaging element, the image data read out from the photoelectric conversion element is processed, and the processed image data is output at an output frame rate.

Figure 5B:
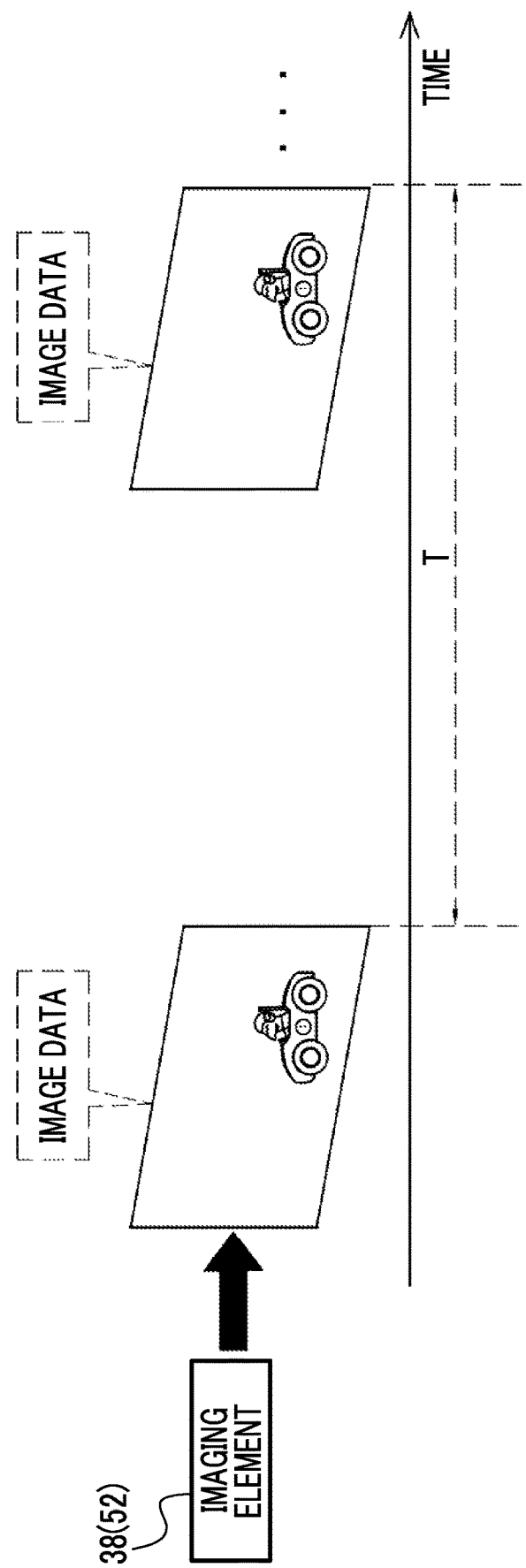
FIG. 5B is a conceptual diagram for describing an output frame rate of the imaging element included in the imaging apparatus according to the embodiment.

The imaging frame rate and the output frame rate have a relationship of "imaging frame rate>output frame rate". That is, the output frame rate is a frame rate lower than the imaging frame rate. For example, the imaging frame rate is a frame rate at which the image data of eight frames is read out from the photoelectric conversion element within a period T as illustrated in FIG. 5A, and the output frame rate is a frame rate at which the image data of two frames is output within the period T as illustrated in FIG. 5B. Any of the imaging frame rate and the output frame rate is a variable frame rate.

In the present embodiment, a frame rate of the second imaging element 52 is higher than a frame rate of the first imaging element 38. For example, 240 fps is employed as the imaging frame rate of the second imaging element 52. For example, 120 fps is employed as the imaging frame rate of the first imaging element 38. In addition, for example, 60 fps is employed as the output frame rate of the second imaging element 52. For example, 30 fps is employed as the output frame rate of the first imaging element 38.

A value of the imaging frame rate and a value of the output frame rate illustrated here are merely an example. For example, the imaging frame rate of the second imaging element 52 may be a frame rate exceeding 240 fps or may be a frame rate less than 240 fps. The imaging frame rate of the first imaging element 38 may be a frame rate exceeding 60 fps or may be a frame rate less than 60 fps as long as the imaging frame rate of the first imaging element 38 is a frame rate lower than the imaging frame rate of the second imaging element 52. In addition, for example, the output frame rate of the second imaging element 52 may be a frame rate exceeding 60 fps or may be a frame rate less than 60 fps. In addition, for example, the output frame rate of the first imaging element 38 may be a frame rate exceeding 30 fps or may be a frame rate less than 30 fps as long as the output frame rate of the first imaging element 38 is a frame rate lower than the output frame rate of the second imaging element 52.

Figure 6:
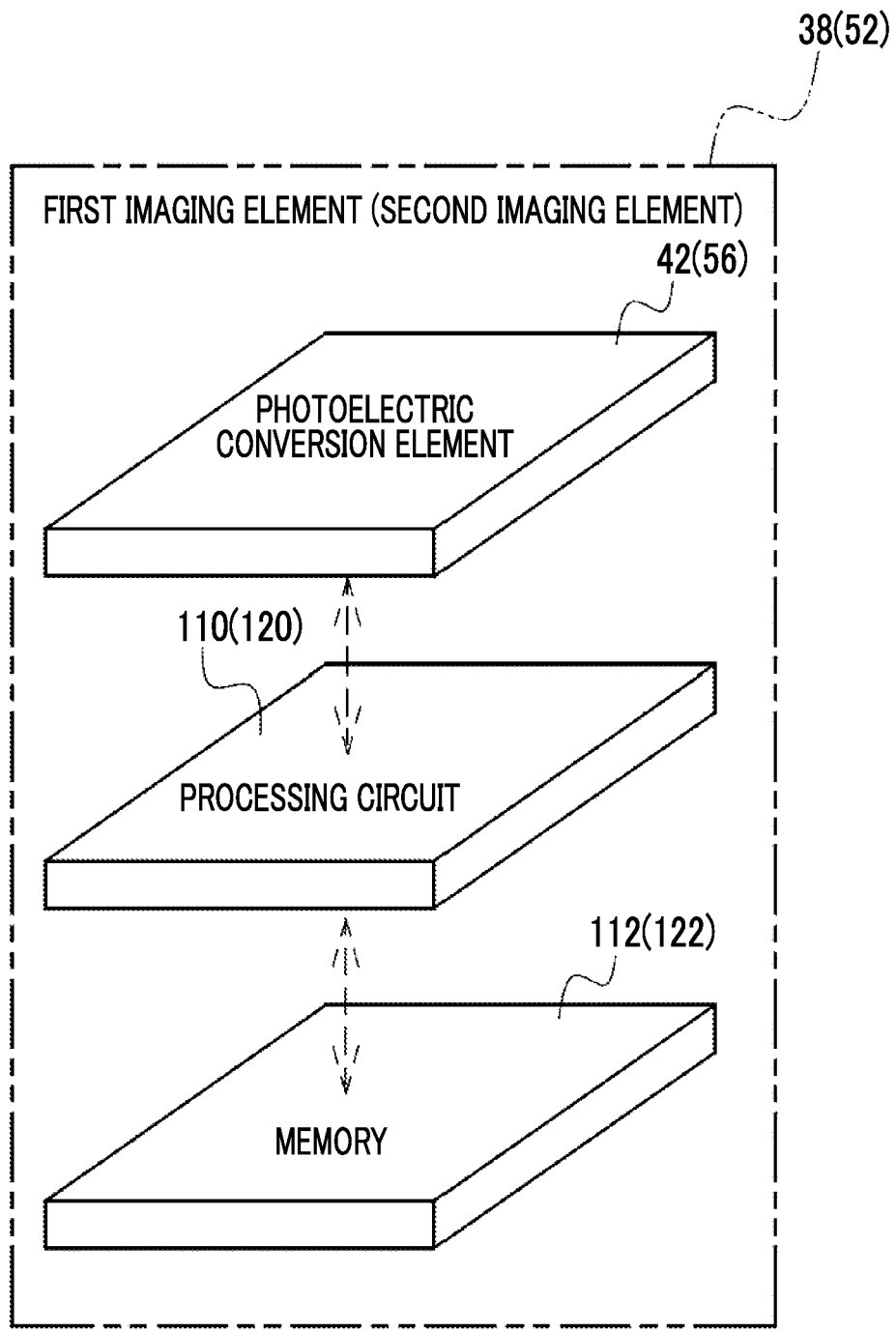
FIG. 6 is a conceptual diagram illustrating an example of a laminated structure of each of a first imaging element and a second imaging element according to the embodiment.

As illustrated in FIG. 6 as an example, the first imaging element 38 incorporates the photoelectric conversion element 42, a processing circuit 110, and a memory 112. The first imaging element 38 is an imaging element in which the photoelectric conversion element 42, the processing circuit 110, and the memory 112 are formed in one chip. That is, the photoelectric conversion element 42, the processing circuit 110, and the memory 112 are formed in one package. In the first imaging element 38, the photoelectric conversion element 42 is laminated with the processing circuit 110 and the memory 112. Specifically, the photoelectric conversion element 42 and the processing circuit 110 are electrically connected to each other by a bump (not illustrated) of copper or the like having conductivity. The processing circuit 110 and the memory 112 are also electrically connected to each other by a bump (not illustrated) of copper or the like having conductivity. While a three-layer structure of the photoelectric conversion element 42, the processing circuit 110, and the memory 112 is illustrated here, the technology of the present disclosure is not limited thereto. A two-layer structure of the photoelectric conversion element 42 and a memory layer in which the processing circuit 110 and the memory 112 are formed in one layer may be used.

The second imaging element 52 is also an imaging element having the same laminated structure as the first imaging element. The second imaging element 52 incorporates the photoelectric conversion element 56, a processing circuit 120, and a memory 122. The second imaging element 52 is an imaging element in which the photoelectric conversion element 56, the processing circuit 120, and the memory 122 are formed in one chip. That is, the photoelectric conversion element 56, the processing circuit 120, and the memory 122 are formed in one package. In the second imaging element 52, the photoelectric conversion element 56 is laminated with the processing circuit 120 and the memory 122. Specifically, the photoelectric conversion element 56 and the processing circuit 120 are electrically connected to each other by a bump (not illustrated) of copper or the like having conductivity. The processing circuit 120 and the memory 122 are also electrically connected to each other by a bump (not illustrated) of copper or the like having conductivity. While a three-layer structure of the photoelectric conversion element 56, the processing circuit 120, and the memory 122 is illustrated here, the technology of the present disclosure is not limited thereto. A two-layer structure of the photoelectric conversion element 56 and a memory layer in which the processing circuit 120 and the memory 122 are formed in one layer may be used. The second imaging element 52 is an example of a "laminated imaging element" according to the embodiment of the technology of the present disclosure. Each photoelectric conversion element and the processing circuit and the like are connected without the external I/F. Thus, high-speed communication can be performed between each other.

Hereinafter, the processing circuits 110 and 120 will be referred to as the "processing circuit" without the reference signs unless otherwise necessary to distinguish therebetween. The memories 112 and 122 will be referred to as the "memory" without the reference signs unless otherwise necessary to distinguish therebetween.

For example, the processing circuit is an LSI. The memory is a memory of which a writing timing and a reading timing are different. Here, a DRAM is employed as an example of the memory. The technology of the present disclosure is also established in a case where the memory is a storage device of other types such as an SRAM.

The processing circuit is a device including an ASIC and an FPGA and controls the entire imaging element in accordance with the instruction of the controller 15. Here, while the device including the ASIC and the FPGA is illustrated as the processing circuit, the technology of the present disclosure is not limited thereto. For example, the processing circuit may be a device including an ASIC, an FPGA, or a PLD, a device including an FPGA and a PLD, or a device including an ASIC and a PLD.

In addition, the processing circuit may be a computer including a CPU, a storage, and a memory. The storage refers to a non-volatile storage device such as a flash memory. The memory temporarily stores various types of information and is used as a work memory. A RAM is exemplified as an example of the memory. However, the technology of the present disclosure is not limited thereto. A storage device of other types may be used. The number of CPUs included in the computer may be singular or plural. In addition, a GPU may be used instead of the CPU. In addition, the processing circuit may be implemented by a combination of a hardware configuration and a software configuration.

The photoelectric conversion element includes a plurality of photodiodes arranged in a matrix form. Photodiodes of "4896×3265" pixels are exemplified as an example of the plurality of photodiodes.

Color filters are arranged in each photodiode included in the photoelectric conversion element. The color filters include a G filter corresponding to green (G) that most contributes to obtaining a brightness signal, an R filter corresponding to red (R), and a B filter corresponding to blue (B).

The photoelectric conversion element includes R pixels, G pixels, and B pixels. The R pixels are pixels corresponding to photodiodes in which the R filter is arranged. The G pixels are pixels corresponding to photodiodes in which the G filter is arranged. The B pixels are pixels corresponding to photodiodes in which the B filter is arranged. The R pixels, the G pixels, and the B pixels are arranged with predetermined periodicity in each of a row direction (horizontal direction) and a column direction (vertical direction). In the present embodiment, the R pixels, the G pixels, and the B pixels are arranged with periodicity corresponding to X-Trans (registered trademark) arrangement. While the X-Trans arrangement is illustrated here, the technology of the present disclosure is not limited thereto. Arrangement of the R pixels, the G pixels, and the B pixels may be Bayer arrangement or Honeycomb (registered trademark) arrangement.

The imaging element has a so-called electronic shutter function and controls an electric charge accumulation time period of each photodiode in the photoelectric conversion element by performing the electronic shutter function under control of the controller 15. The electric charge accumulation time period refers to a so-called shutter speed. Imaging by the imaging element is implemented by performing the electronic shutter function using a rolling shutter method. While the rolling shutter method is illustrated here, the technology of the present disclosure is not limited thereto. A global shutter method may be applied instead of the rolling shutter method.

Figure 7:
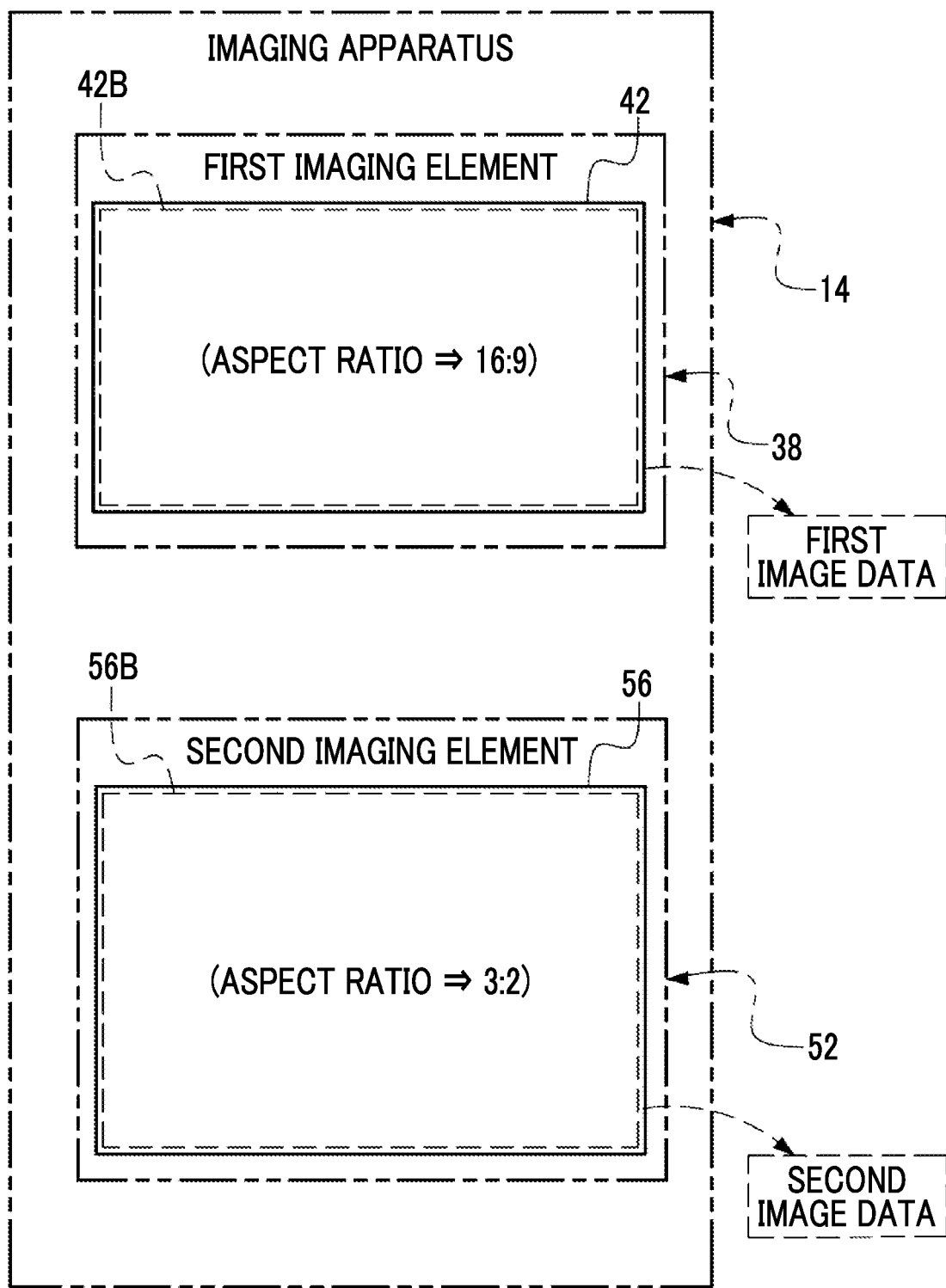
FIG. 7 is a conceptual diagram illustrating an example of an aspect ratio of a photoelectric conversion element of each of the first imaging element and the second imaging element according to the embodiment.

An area (size of a light receiving region) of a region of the photoelectric conversion element 42 on the object side is the same as an area (size of a light receiving region) of a region of the photoelectric conversion element 56 on the object side. As illustrated in FIG. 7 as an example, the first image data is obtained from a first region 42B defined in the photoelectric conversion element 42, and the second image data is obtained from a second region 56B designated in the photoelectric conversion element 56. The second region 56B is a region wider than the first region 42B. That is, the second region 56B cut out from the photoelectric conversion element 56 is a region wider than the first region 42B cut out from the photoelectric conversion element 42. In the example illustrated in FIG. 7, the first region 42B is a region of which an aspect ratio is defined as 16:9, and the second region 56B is a region of which an aspect ratio is defined as 3:2.

Figure 8:
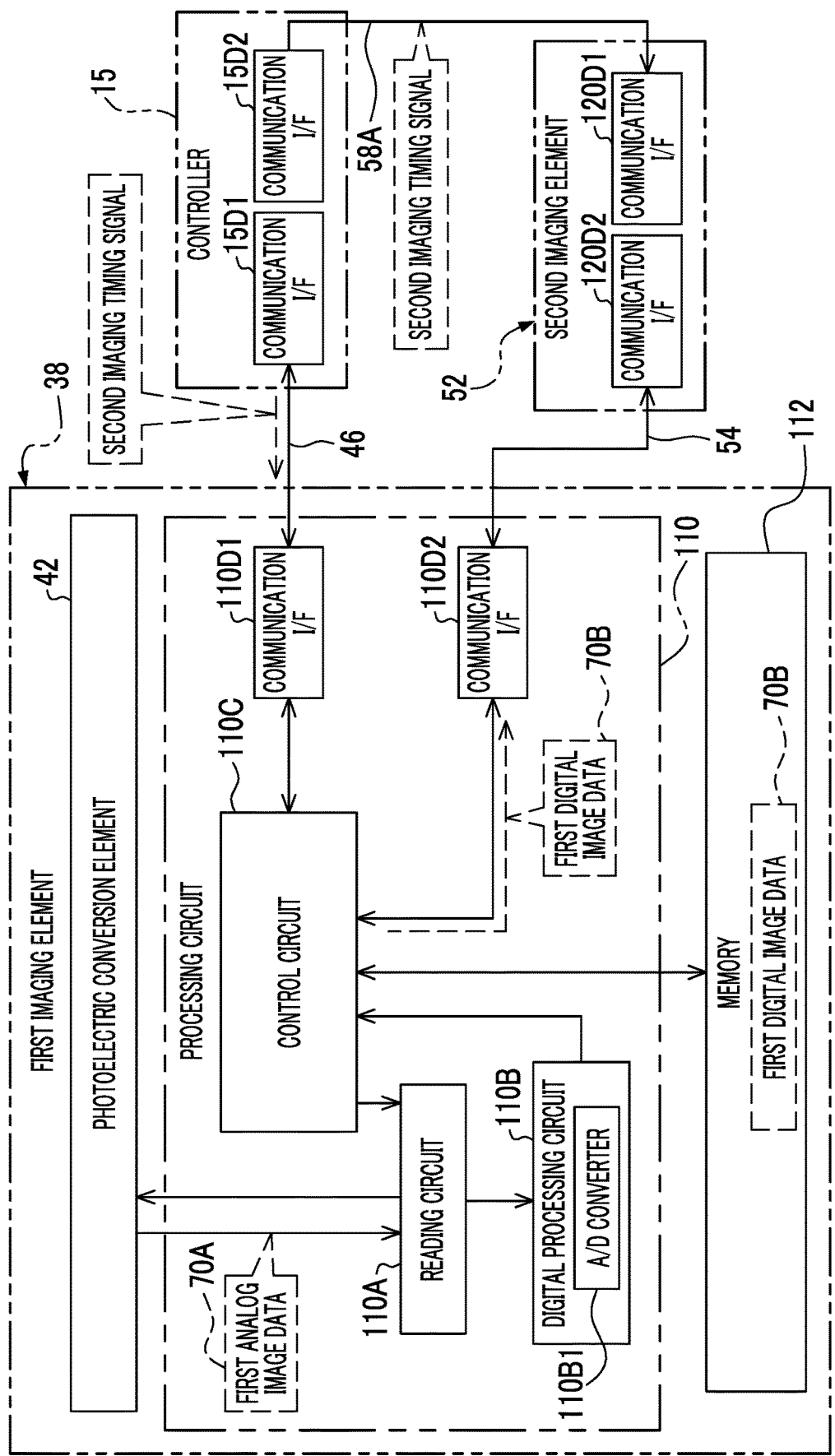
FIG. 8 is a block diagram illustrating an example of a configuration of the first imaging element and an edge part according to the embodiment.

As illustrated in FIG. 8 as an example, the processing circuit 110 comprises communication I/Fs 110D1 and 110D2. The communication I/F 15D1 of the controller 15 is connected to the communication I/F 110D1 of the processing circuit 110 and outputs the first imaging timing signal to the communication I/F 110D1. The communication I/F 110D1 receives the first imaging timing signal output from the communication I/F 15D1.

The second imaging element 52 comprises communication I/Fs 120D1 and 120D2. The communication I/F 120D2 is connected to the communication I/F 110D2 of the first imaging element 38. The communication I/F 110D2 of the processing circuit 110 outputs various types of information such as the first image data to the communication I/F 120D2 of the second imaging element 52, and the communication I/F 120D2 receives the various types of information output from the communication I/F 110D2. The communication I/F 120D1 of the second imaging element 52 is connected to the communication I/F 15D2 of the controller 15. The controller 15 outputs various types of information including the second imaging timing signal to the communication I/F 120D1 of the second imaging element 52. The communication I/F 120D1 receives various types of information output from the communication I/F 15D2.

In the first imaging element 38, the processing circuit 110 comprises, in addition to the communication I/F 110D1 and the communication I/F 110D2, a reading circuit 110A, a digital processing circuit 110B, and a control circuit 110C.

The reading circuit 110A is connected to each of the photoelectric conversion element 42, the digital processing circuit 110B, and the control circuit 110C. The digital processing circuit 110B is connected to the control circuit 110C. The control circuit 110C is connected to each of the memory 112, the communication I/F 110D1, and the communication I/F 110D2.

As illustrated in FIG. 8 as an example, the first image data is broadly divided into first analog image data 70A and first digital image data 70B. Hereinafter, for convenience of description, the first analog image data 70A and the first digital image data 70B will be referred to as the "first image data" without the reference signs unless otherwise necessary to distinguish therebetween.

Each of the communication I/Fs 110D1 and 110D2 of the processing circuit 110 is a communication device of which at least a part is configured with a circuit. In addition, each of the communication I/Fs 15D1 and 15D2 of the controller 15 is a communication device of which at least a part is configured with a circuit. Furthermore, each of the communication I/Fs 120D1 and 120D2 of the second imaging element 52 is a communication device of which at least a part is configured with a circuit.

The communication I/F 110D1 of the processing circuit 110 and the communication I/F 15D1 of the controller 15 are connected in accordance with a PCIe connection standard. In addition, the communication I/F 110D2 of the processing circuit 110 and the communication I/F 120D2 of the second imaging element 52 are connected in accordance with the PCIe connection standard. Furthermore, the communication I/F 120D1 of the second imaging element 52 and the communication I/F 15D2 of the controller 15 are connected in accordance with the PCIe connection standard.

The communication I/F 110D1 receives the first imaging timing signal output from the communication I/F 15D1 of the controller 15 and transfers the received first imaging timing signal to the control circuit 110C.

The reading circuit 110A controls the photoelectric conversion element 42 and reads out the first analog image data 70A obtained by imaging performed by the photoelectric conversion element 42 from the photoelectric conversion element 42 under control of the control circuit 110C. Reading of the first analog image data 70A from the photoelectric conversion element 42 is performed in accordance with the first imaging timing signal which is input into the processing circuit 110 from the controller 15. That is, the first analog image data 70A is read out from the photoelectric conversion element 42 by the reading circuit 110A at a first imaging frame rate defined by the first imaging timing signal.

Specifically, first, the communication I/F 110D1 receives the first imaging timing signal from the controller 15 and transfers the received first imaging timing signal to the control circuit 110C. Next, the control circuit 110C transfers the first imaging timing signal transferred from the communication I/F 110D1 to the reading circuit 110A. That is, the vertical synchronization signal and the horizontal synchronization signal are transferred to the reading circuit 110A. The reading circuit 110A starts reading out the first analog image data 70A in units of frames from the photoelectric conversion element 42 in accordance with the vertical synchronization signal transferred from the control circuit 110C. In addition, the reading circuit 110A starts reading out the first analog image data 70A in units of horizontal lines in accordance with the horizontal synchronization signal transferred from the control circuit 110C.

The reading circuit 110A performs analog signal processing on the first analog image data 70A read out from the photoelectric conversion element 42. The analog signal processing includes well-known processing such as noise cancelation processing and analog gain processing. The noise cancelation processing is processing of canceling a noise caused by variations in characteristics between pixels included in the photoelectric conversion element 42. The analog gain processing is processing of applying a gain to the first analog image data 70A. The first analog image data 70A on which the analog signal processing is performed in such a manner is output to the digital processing circuit 110B by the reading circuit 110A.

The digital processing circuit 110B comprises an A/D converter 110B1. The A/D converter 110B1 performs A/D conversion on the first analog image data 70A.

The digital processing circuit 110B performs digital signal processing on the first analog image data 70A input from the reading circuit 110A. For example, the digital signal processing includes the A/D conversion performed by the A/D converter 110B1, and digital gain processing.

The A/D converter 110B1 performs the A/D conversion on the first analog image data 70A. Accordingly, the first analog image data 70A is digitized, and the first digital image data 70B is obtained as RAW data. The digital gain processing is performed on the first digital image data 70B by the digital processing circuit 110B. The digital gain processing refers to processing of applying a gain to the first digital image data 70B. The first digital image data 70B obtained by performing the digital signal processing in such a manner is output to the control circuit 110C by the digital processing circuit 110B.

The memory 112 is a memory that can store the first digital image data 70B of a plurality of frames in units of frames. The control circuit 110C stores the first digital image data 70B input from the digital processing circuit 110B in the memory 112. The memory 112 has a storage region in units of pixels. The first digital image data 70B is stored in a corresponding storage region of the memory 112 in units of pixels by the control circuit 110C. The control circuit 110C can access the memory 112 and acquires the first digital image data 70B from the memory 112. Random access is exemplified as an example of the access to the memory 112.

Figure 9:
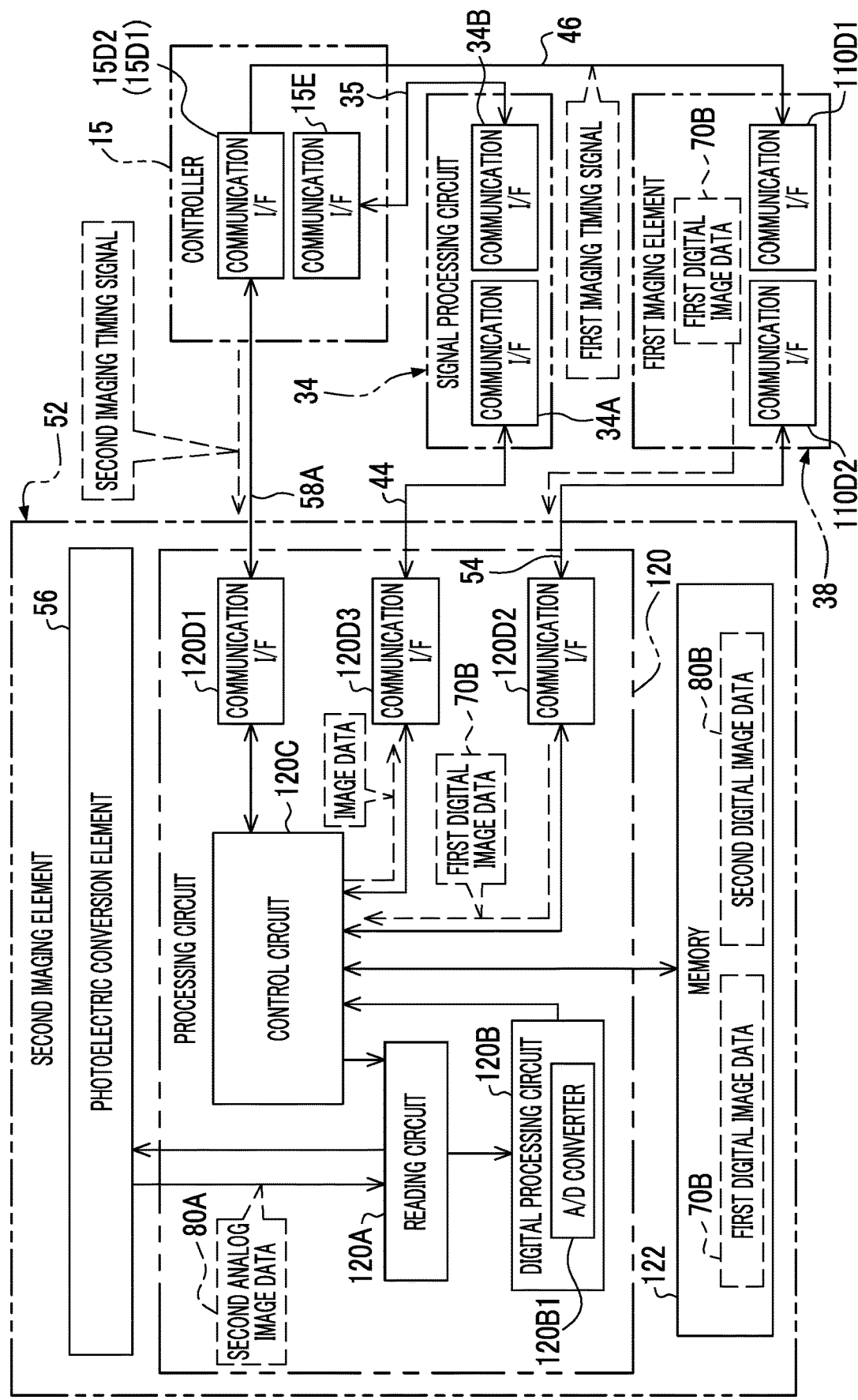
FIG. 9 is a block diagram illustrating an example of a configuration of the second imaging element and an edge part according to the embodiment.

As illustrated in FIG. 9 as an example, the processing circuit 120 comprises communication I/Fs 120D1, 120D2, and 120D3. The communication I/F 15D2 of the controller 15 is connected to the communication I/F 120D1 of the processing circuit 120 and outputs the second imaging timing signal to the communication I/F 120D1. The communication I/F 120D1 receives the second imaging timing signal output from the communication I/F 15D2.

The signal processing circuit 34 comprises communication I/Fs 34A and 34B. Each of the communication I/Fs 34A and 34B is a communication device of which at least a part is configured with a circuit. The communication I/F 34A is connected to the communication I/F 120D3 of the processing circuit 120, and the communication I/F 34B is connected to the communication I/F 15E of the controller 15.

The communication I/F 120D1 of the processing circuit 120 and the communication I/F 15D2 of the controller 15 are connected in accordance with the PCIe connection standard. In addition, the communication I/F 120D3 of the processing circuit 120 and the communication I/F 34A of the signal processing circuit 34 are connected in accordance with the PCIe connection standard. Furthermore, the communication I/F 34B of the signal processing circuit 34 and the communication I/F 15E of the controller 15 are connected in accordance with the PCIe connection standard.

The communication I/F 120D3 of the processing circuit 120 outputs various types of information such as the first image data and combined image data 90 (refer to FIG. 15) described later to the communication I/F 34A of the signal processing circuit 34. The communication I/F 34A receives the various types of information output from the communication I/F 120D3. The signal processing circuit 34 performs signal processing as necessary on the various types of information received by the communication I/F 34A. The communication I/F 34B is connected to the communication I/F 15E of the controller 15 and outputs the various types of information to the communication I/F 15E of the controller 15. The communication I/F 15E receives the various types of information output from the communication I/F 34B.

Hereinafter, the communication I/F 110D1, the communication I/F 110D2, the communication I/F 120D1, the communication I/F 120D2, the communication I/F 102D3, the communication I/F 34A, the communication I/F 34B, the communication I/F 15E, the communication I/F 15D1, and the communication I/F 15D2 will be referred to as the "communication I/F" without the reference signs unless otherwise necessary to distinguish therebetween.

As described above, here, the communication device of which at least the part is configured with the circuit is employed as the communication I/F. A device including an ASIC, an FPGA, and/or a PLD is exemplified as an example of the communication I/E In addition, the communication I/F may be a computer including a CPU, a storage such as a flash memory, and a memory such as a RAM. In this case, the number of CPUs included in the computer may be singular or plural. A GPU may be used instead of the CPU. In addition, the communication I/F may be implemented by a combination of a hardware configuration and a software configuration.

In the second imaging element 52, the processing circuit 120 comprises, in addition to the communication I/F 120D1, 120D2, and 120D3, a reading circuit 120A, a digital processing circuit 120B, and a control circuit 120C. The control circuit 120C is an example of a "processing portion (control circuit)" according to the embodiment of the technology of the present disclosure.

The reading circuit 120A is connected to each of the photoelectric conversion element 56, the digital processing circuit 120B, and the control circuit 120C. The digital processing circuit 120B is connected to the control circuit 120C. The control circuit 120C is connected to each of the memory 122, the communication I/F 120D1, the communication I/F 120D2, and the communication I/F 120D3.

As illustrated in FIG. 9 as an example, the second image data is broadly divided into second analog image data 80A and second digital image data 80B. Hereinafter, for convenience of description, the second analog image data 80A and the second digital image data 80B will be referred to as the "second image data" without the reference signs unless otherwise necessary to distinguish therebetween.

The communication I/F 120D1 receives the second imaging timing signal output from the communication I/F 15D2 of the controller 15 and transfers the received second imaging timing signal to the control circuit 120C.

The reading circuit 120A controls the photoelectric conversion element 56 and reads out the second analog image data 80A obtained by imaging performed by the photoelectric conversion element 56 from the photoelectric conversion element 56 under control of the control circuit 120C. Reading of the second analog image data 80A from the photoelectric conversion element 56 is performed in accordance with the second imaging timing signal which is input into the processing circuit 120 from the controller 15. That is, the second analog image data 80A is read out from the photoelectric conversion element 56 by the reading circuit 120A at a second imaging frame rate defined by the second imaging timing signal.

Specifically, first, the communication I/F 120D1 receives the second imaging timing signal from the controller 15 and transfers the received second imaging timing signal to the control circuit 120C. Next, the control circuit 120C transfers the second imaging timing signal transferred from the communication I/F 120D1 to the reading circuit 120A. That is, the vertical synchronization signal and the horizontal synchronization signal are transferred to the reading circuit 120A. The reading circuit 120A starts reading out the second analog image data 80A in units of frames from the photoelectric conversion element 56 in accordance with the vertical synchronization signal transferred from the control circuit 120C. In addition, the reading circuit 120A starts reading out the second analog image data 80A in units of horizontal lines in accordance with the horizontal synchronization signal transferred from the control circuit 120C.

The reading circuit 120A performs analog signal processing on the second analog image data 80A read out from the photoelectric conversion element 56. The analog signal processing includes well-known processing such as noise cancelation processing and analog gain processing. The noise cancelation processing is processing of canceling a noise caused by variations in characteristics between pixels included in the photoelectric conversion element 56. The analog gain processing is processing of applying a gain to the second analog image data 80A. The second analog image data 80A on which the analog signal processing is performed in such a manner is output to the digital processing circuit 120B by the reading circuit 120A.

The digital processing circuit 120B comprises an A/D converter 120B1. The A/D converter 120B1 performs A/D conversion on the second analog image data 80A.

The digital processing circuit 120B performs digital signal processing on the second analog image data 80A input from the reading circuit 120A. For example, the digital signal processing includes the A/D conversion performed by the A/D converter 120B1, and digital gain processing.

The A/D converter 120B1 performs the A/D conversion on the second analog image data 80A. Accordingly, the second analog image data 80A is digitized, and the second digital image data 80B is obtained as RAW data. The digital gain processing is performed on the second digital image data 80B by the digital processing circuit 120B. The digital gain processing refers to processing of applying a gain to the second digital image data 80B. The second digital image data 80B obtained by performing the digital signal processing in such a manner is output to the control circuit 120C by the digital processing circuit 120B.

Hereinafter, for convenience of description, the first digital image data 70B and the second digital image data 80B will be referred to as the "digital image data" without the reference signs unless otherwise necessary to distinguish therebetween.

The memory 122 is a memory that can store the digital image data of a plurality of frames in units of frames. The control circuit 120C stores the second digital image data 80B input from the digital processing circuit 120B in the memory 122. In addition, the control circuit 120C stores the first digital image data 70B received by the communication I/F 120D2 in the memory 122. The memory 122 has a storage region in units of pixels. The digital image data is stored in a corresponding storage region of the memory 122 in units of pixels by the control circuit 120C. The control circuit 120C can access the memory 122. Random access is exemplified as an example of the access to the memory 122.

The control circuit 120C acquires the digital image data from the memory 122 and outputs image data based on the acquired digital image data to the signal processing circuit 34 through the communication I/F 120D3. Here, the "image data based on the digital image data" refers to image data based on the first digital image data 70B or the second digital image data 80B. For example, the image data based on the second digital image data 80B refers to the second digital image data 80B or the combined image data 90 described later.

In the signal processing circuit 34, the image data input from the communication I/F 120D3 is received by the communication I/F 34A, and various types of signal processing are performed on the received image data.

Figure 10:
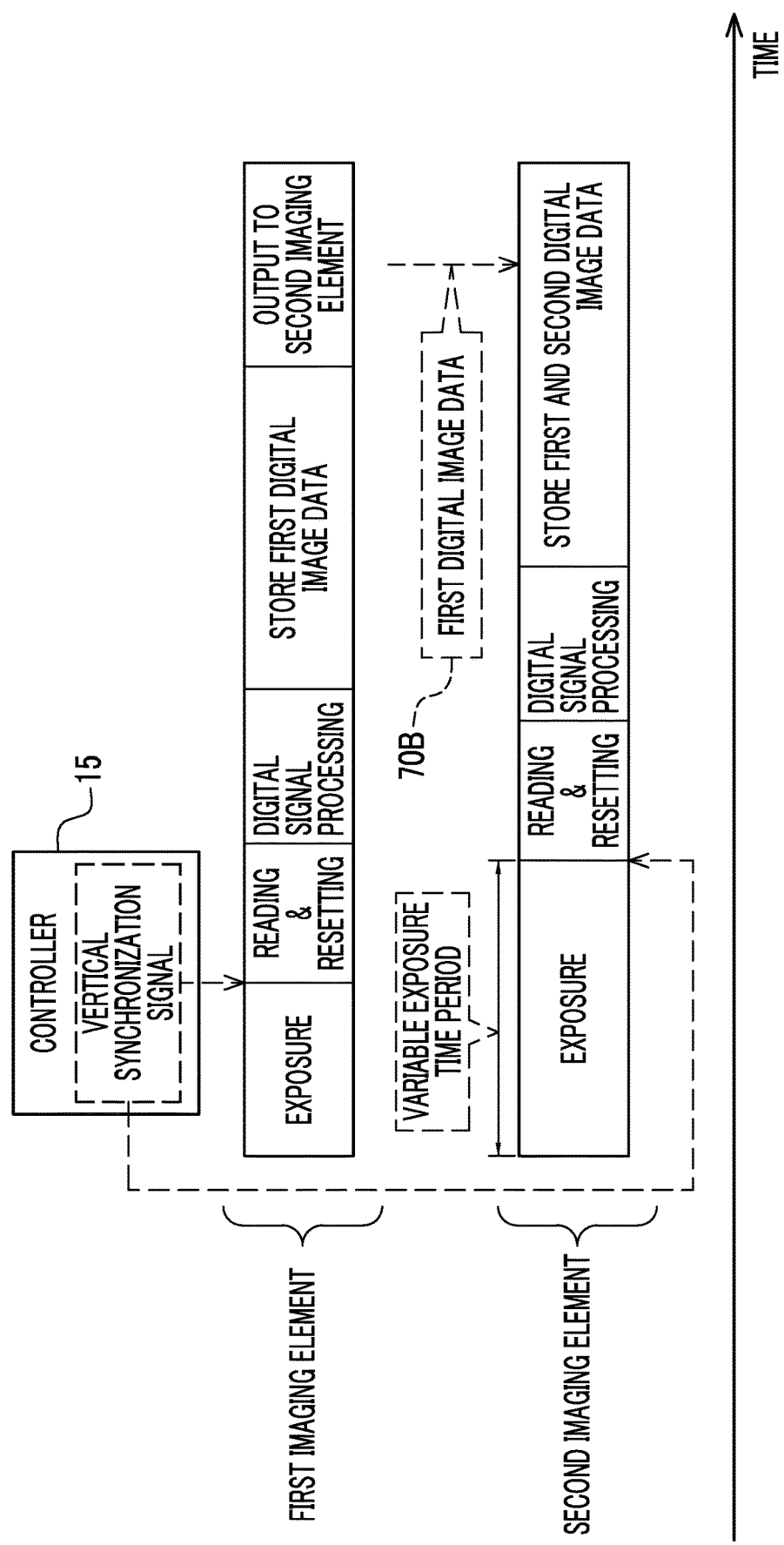
FIG. 10 is a conceptual diagram illustrating an example of a flow of image data between the first imaging element and the second imaging element included in the imaging apparatus according to the embodiment.

As illustrated in FIG. 10 as an example, in the first imaging element 38, the first analog image data 70A is generated by exposing the photoelectric conversion element 42. In a case where the vertical synchronization signal is input, reading of the first analog image data 70A from the photoelectric conversion element 42 and resetting of the photoelectric conversion element 42 are performed. Resetting of the photoelectric conversion element 42 refers to an operation of deleting residual electric charges of each pixel in the photoelectric conversion element 42. The exposure performed by the photoelectric conversion element 42 is performed after previous resetting of the photoelectric conversion element 42 by the reading circuit 110A and before reading.

The first digital image data 70B is generated by performing the digital signal processing on the first analog image data 70A, and the generated first digital image data 70B is stored in the memory 112. The first digital image data 70B stored in the memory 112 is output to the second imaging element 52 and is stored in the memory 122 of the second imaging element 52.

Meanwhile, in the second imaging element 52, the second analog image data 80A is generated by exposing the photoelectric conversion element 56. In a case where the vertical synchronization signal is input, reading of the second analog image data 80A from the photoelectric conversion element 56 and resetting of the photoelectric conversion element 56 are performed. Resetting of the photoelectric conversion element 56 refers to an operation of deleting residual electric charges of each pixel in the photoelectric conversion element 56. The exposure performed by the photoelectric conversion element 56 is performed after previous resetting of the photoelectric conversion element 56 by the reading circuit 120A and before reading.

An exposure time period of the photoelectric conversion element 56 is a variable exposure time period. The variable exposure time period refers to an exposure time period that is changeable for each frame by the control circuit 120C. For example, the control circuit 120C changes the exposure time period of the photoelectric conversion element 56 in accordance with an imaging condition or the like (for example, brightness of an imaging scene and/or an instruction received by the reception device 84) under control of the controller 15. For example, the exposure time period of the photoelectric conversion element 56 is changed by shifting an input timing of the vertical synchronization signal input into the second imaging element 52. In such a manner, by changing the exposure time period of the photoelectric conversion element 56 for each frame, imaging of which an exposure amount is changeable for each frame is performed in the second imaging element 52.

The second digital image data 80B is generated by performing the digital signal processing on the second analog image data 80A. The second digital image data 80B is stored in the memory 122 by the control circuit 120C.

In the imaging apparatus 14 according to the present embodiment, wide angle imaging and telephoto imaging are performed. The wide angle imaging is performed by the first imaging apparatus 30, and the telephoto imaging is performed by the second imaging apparatus 32. As illustrated in FIG. 11 as an example, a focal length (hereinafter, referred to as a "first focal length") set for the first imaging apparatus 30 is shorter than a focal length (hereinafter, referred to as a "second focal length") set for the second imaging apparatus 32. Thus, an angle of view of imaging performed by the first imaging apparatus 30 is wider than an angle of view of imaging performed by the second imaging apparatus 32. In addition, the second focal length is changed by the optical zoom mechanism 59 (refer to FIG. 3). In this case, a movement range of the zoom lens 18B is restricted to a range within which a relationship "second focal length>first focal length" is maintained.

In the present embodiment, a position of the image forming lens 16B on the optical axis L1 (refer to FIG. 3) is invariable. The image forming lens 16B may be a lens movable on the optical axis L1. In this case, a movement range of the image forming lens 16B is restricted to a range within which the relationship "second focal length>first focal length" is maintained.

Figure 12:
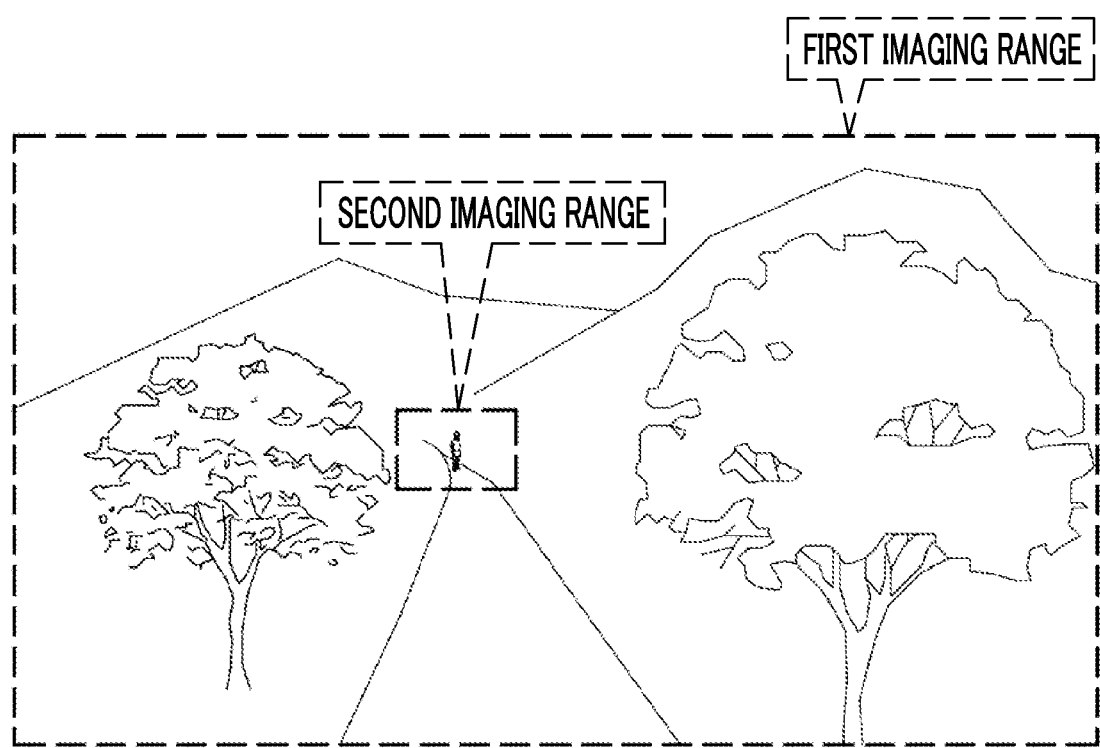
FIG. 12 is a conceptual diagram illustrating an example of an imaging range (first imaging range) of the first imaging apparatus and an imaging range (second imaging range) of the second imaging apparatus.

The first imaging apparatus 30 and the second imaging apparatus 32 have the relationship "second focal length>first focal length". Thus, as illustrated in FIG. 12 as an example, an imaging range (hereinafter, referred to as a "first imaging range") of the first imaging apparatus 30 is wider than an imaging range (hereinafter, referred to as a "second imaging range") of the second imaging apparatus 32. In addition, the first imaging range overlaps with the second imaging range. That is, the second imaging range is included in the first imaging range.

Figure 13:
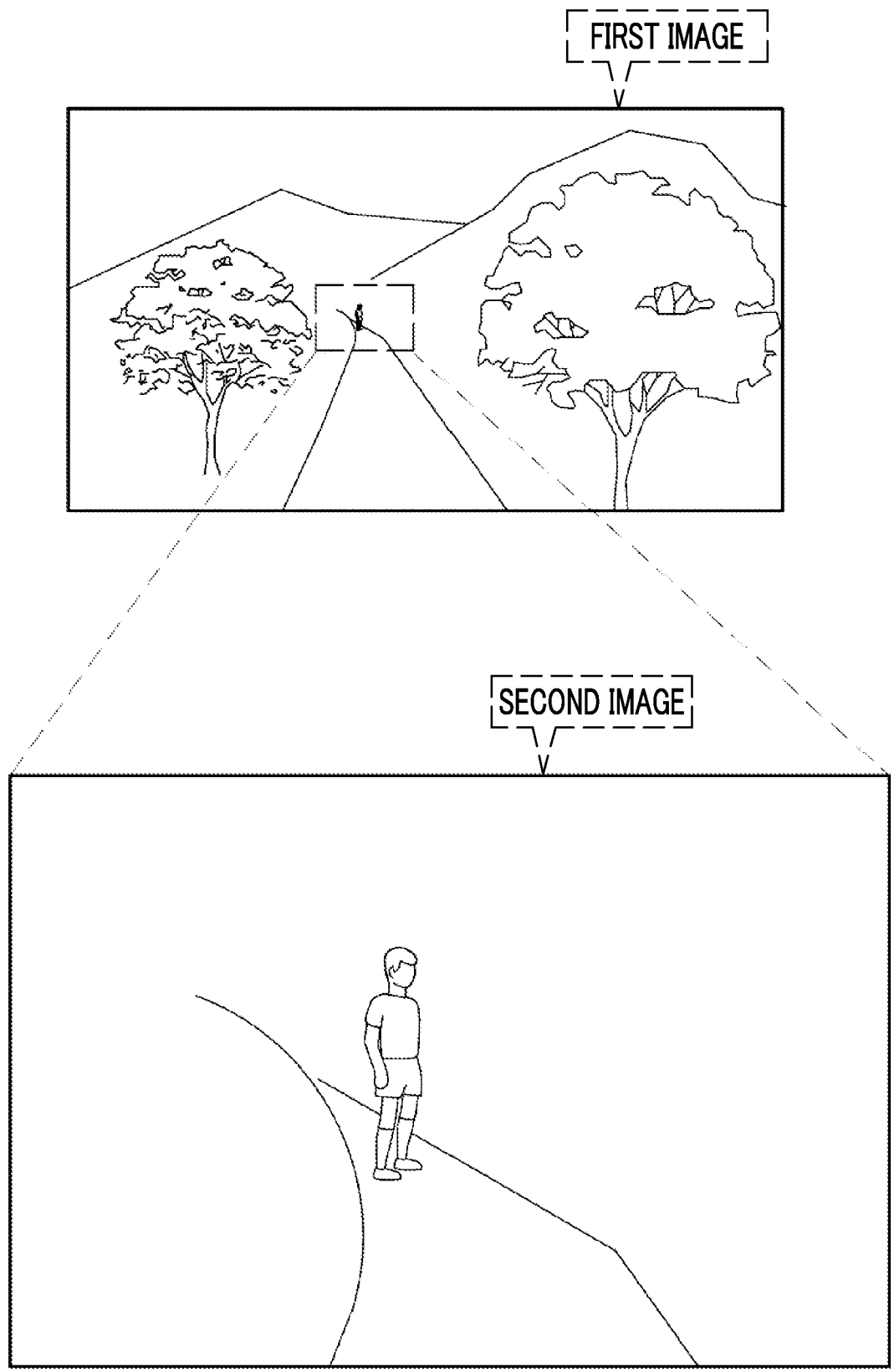
FIG. 13 is an image diagram illustrating an example of a first image indicated by first digital image data obtained by imaging the first imaging range using the first imaging apparatus and an example of a second image indicated by second digital image data obtained by imaging the second imaging range using the second imaging apparatus.

As illustrated in FIG. 13 as an example, a first image (hereinafter, simply referred to as the "first image") that is an image indicated by the first digital image data 70B obtained by imaging the first imaging range using the first imaging element 38 included in the first imaging apparatus 30 is an image of a wider angle than a second image (hereinafter, simply referred to as the "second image") that is an image indicated by the second digital image data 80B obtained by imaging the second imaging range using the second imaging element 52 included in the second imaging apparatus 32. The second image has a higher resolution than the first image. That is, a pixel density of the second image is higher than a pixel density of the first image.

Here, an example of a transfer path and a processing method of the image data will be described with reference to FIG. 14 and FIG. 15.

Figure 14:
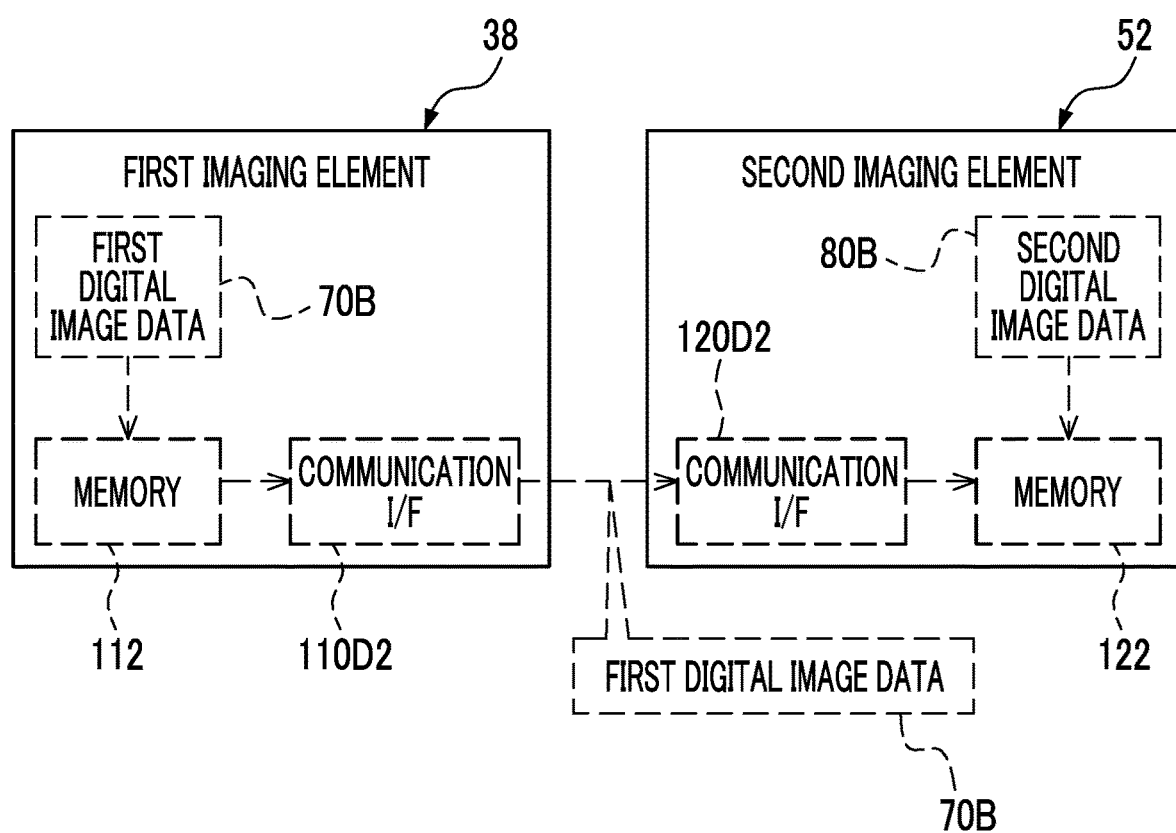
FIG. 14 is a time chart illustrating an example of a processing content in each of the first imaging element and the second imaging element included in the imaging apparatus according to the embodiment.

As illustrated in FIG. 14 as an example, the first digital image data 70B obtained by imaging the subject using the first imaging element 38 is temporarily stored in the memory 112 and then, is output to the second imaging element 52 by the communication I/F 110D2. The first imaging element 38 and the second imaging element 52 are imaging elements connected in series. The communication I/F 120D2 of the first imaging element 38 that is a front stage imaging element outputs the first digital image data 70B to the second imaging element 52 that is the rear stage imaging element. The first digital image data 70B output by the communication I/F 120D2 is received by the communication I/F 120D2 of the second imaging element 52, and the received first digital image data 70B is stored in the memory 122. In addition, the second digital image data 80B obtained by imaging performed by the second imaging element 52 is stored in the memory 122.

The first digital image data 70B stored in the memory 122 is digital image data obtained by imaging the first imaging range with the first focal length using the first imaging element 38. In addition, the second digital image data 80B stored in the memory 122 is digital image data obtained by imaging the second imaging range with the second focal length longer than the first focal length using the second imaging element. The first digital image data 70B is an example of "first focal length image data" according to the embodiment of the technology of the present disclosure. The second digital image data 80B is an example of "second focal length image data" according to the embodiment of the technology of the present disclosure.

Figure 15:
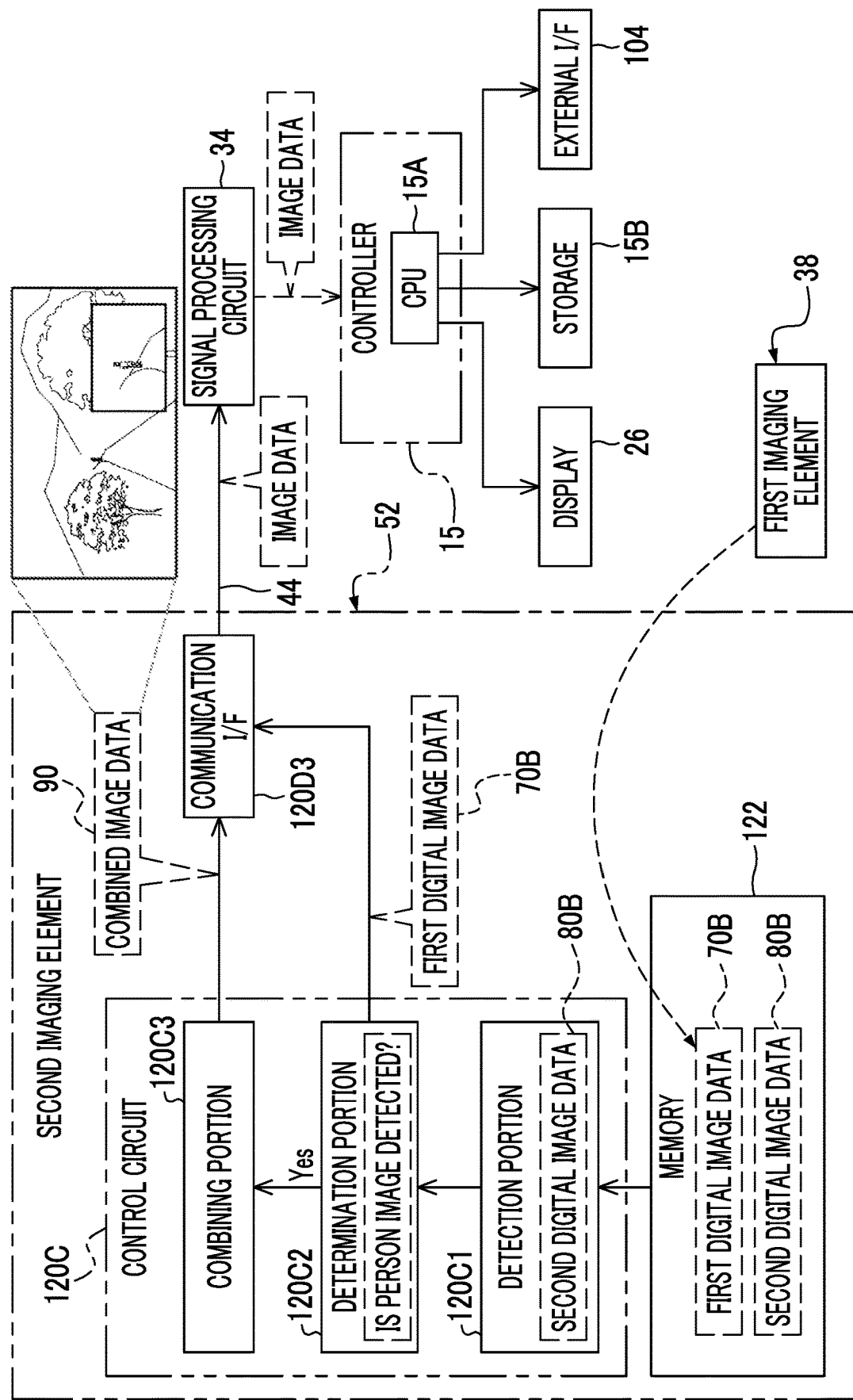
FIG. 15 is a conceptual diagram illustrating an example of functions of the second imaging element according to the embodiment.

As illustrated in FIG. 15 as an example, in the second imaging element 52, the control circuit 120C includes a detection portion 120C1, a determination portion 120C2, and a combining portion 120C3. The first digital image data 70B obtained by imaging the first imaging range (refer to FIG. 12) using the first imaging element 38 and the second digital image data 80B obtained by imaging the second imaging range (refer to FIG. 12) using the second imaging element 52 are stored in the memory 122.

The control circuit 120C processes the second digital image data 80B stored in the memory 122. Specifically, first, the detection portion 120C1 performs detection processing of detecting a person image indicating a person from the second image indicated by the second digital image data stored in the memory 122. The detection portion 120C1 detects the person image using well-known face detection processing. The face detection processing is a well-known technology and thus, will not be described here. The person is an example of a "specific subject" according to the embodiment of the technology of the present disclosure. The "person image" is an example of a "specific subject image" according to the embodiment of the technology of the present disclosure. In addition, the person may be an unspecified person or a specific person (specific individual).

Here, while the person is illustrated as an example of the "specific subject" according to the embodiment of the technology of the present disclosure, the technology of the present disclosure is not limited thereto. A subject (for example, a building, a vehicle, a plant, an insect, an animal, food, and/or a small object) other than the person may be used. In addition, the detection processing may be performed using a learning result obtained by causing a computer or the like to learn (for example, machine-learn) the specific subject image showing the specific subject or a feature amount (frequency characteristics and the like) of the specific subject image in advance.

The determination portion 120C2 determines whether or not the person image is detected from the second image by the detection processing. In a case where the person image is not detected by the detection processing, the determination portion 120C2 acquires the first digital image data 70B from the memory 122. The determination portion 120C2 outputs the first digital image data 70B acquired from the memory 122 to the signal processing circuit 34 through the communication I/F 120D3.

In a case where the person image is detected by the detection processing, the determination portion 120C2 outputs a detection success signal indicating that the person image is detected by the detection processing, to the combining portion 120C3. In a case where the detection success signal is input from the determination portion 120C2, the combining portion 120C3 acquires the first digital image data 70B from the memory 122. The combining portion 120C3 generates the combined image data 90 by combining the first digital image data 70B acquired from the memory 122 with the second digital image data 80B set as a detection target of the detection portion 120C1. For example, an image indicated by the combined image data 90 is an image in which the second image is embedded in the first image as illustrated in FIG. 15. The combining portion 120C3 outputs the combined image data 90 to the signal processing circuit 34 through the communication I/F 120D3.

Here, for example, the first digital image data 70B acquired from the memory 122 by the determination portion 120C2 and the combining portion 120C3 is digital image data obtained by imaging the first imaging range using the first imaging element 38 in synchronization with a timing at which the second imaging range is imaged by the second imaging element 52 in order to obtain the second digital image data 80B set as the detection target of the detection portion 120C 1.

In addition, here, while the image in which the second image is embedded in the first image is exemplified as an example of the image indicated by the combined image data 90, the technology of the present disclosure is not limited thereto. For example, the second image may be superimposed on the first image. The first image and the second image may be connected in an adjacent state. Alpha blending of the first image and the second image may be used. Other combining methods may also be used.

In the signal processing circuit 34, the various types of signal processing are performed on the image data (in the example illustrated in FIG. 15, the first digital image data 70B or the combined image data 90) input from the second imaging element 52, and the image data on which the various types of signal processing are performed is output to the controller 15. In the controller 15, in a case where the image data is input, the image data is stored in the storage 15B or is stored in a smart device, a personal computer, a server, a USB memory, and/or a memory card or the like through the external I/F 104 by the CPU 15A. In addition, in the controller 15, in a case where the image data is input, an image based on the image data is displayed on the display 26 as the still picture image or the live view image by the CPU 15A. Here, while an example of a form in which both of storage of the image data and display of the image based on the image data are performed is exemplified, storage of the image data or display of the image based on the image data may be performed.

Next, actions of parts of the smart device 10 according to the embodiment of the technology of the present disclosure will be described.

Figure 16:
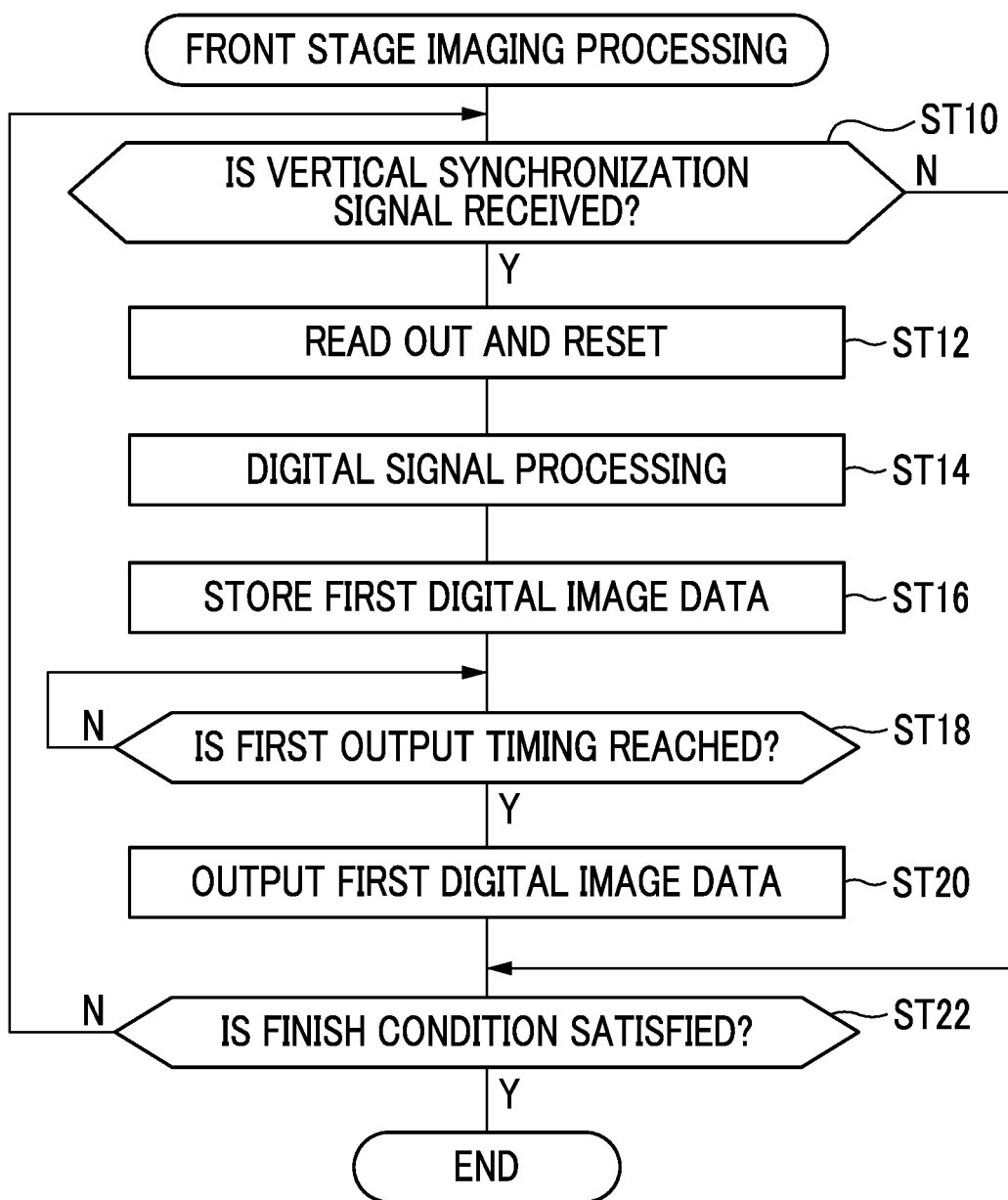
FIG. 16 is a flowchart illustrating an example of a flow of front stage imaging processing according to the embodiment.

First, a flow of front stage imaging processing executed by the processing circuit 110 of the first imaging element 38 will be described with reference to FIG. 16.

In the front stage imaging processing illustrated in FIG. 12, first, in step ST10, the control circuit 110C determines whether or not the vertical synchronization signal from the controller 15 is received by the communication I/F 110D1. In step ST10, in a case where the vertical synchronization signal from the controller 15 is not received by the communication I/F 110D1, a negative determination is made, and the front stage imaging processing transitions to step ST22. In step ST10, in a case where the vertical synchronization signal from the controller 15 is received by the communication I/F 110D1, a positive determination is made, and the front stage imaging processing transitions to step ST12.

In step ST12, the reading circuit 110A reads out the first analog image data 70A and resets the photoelectric conversion element 42. Then, the front stage imaging processing transitions to step ST14.

In step ST14, the digital processing circuit 110B performs the digital signal processing on the first analog image data 70A. Then, the front stage imaging processing transitions to step ST16.

The first digital image data 70B obtained by performing the digital signal processing on the first analog image data 70A in step ST14 is transferred to the control circuit 110C.

In step ST16, the control circuit 110C stores the first digital image data 70B in the memory 112. Then, the front stage imaging processing transitions to step ST18.

In step ST18, the control circuit 110C determines whether or not a timing (first output timing) at which the first digital image data 70B is output to the second imaging element 52 is reached. A timing defined by the output frame rate of the first imaging element 38 is exemplified as an example of the first output timing. In step ST18, in a case where the first output timing is not reached, a negative determination is made, and the determination in step ST18 is performed again. In step ST18, in a case where the first output timing is reached, a positive determination is made, and the front stage imaging processing transitions to step ST20.

In step ST20, the control circuit 110C acquires the first digital image data 70B from the memory 112 and outputs the acquired first digital image data 70B to the second imaging element 52 through the communication I/F 110D2. Then, the front stage imaging processing transitions to step ST22.

In step ST22, the control circuit 110C determines whether or not a condition (hereinafter, referred to as a "front stage imaging processing finish condition") under which the front stage imaging processing is finished is satisfied. A condition that an instruction to finish the front stage imaging processing is received by the reception device 84 (refer to FIG. 4) is exemplified as an example of the front stage imaging processing finish condition. In step ST22, in a case where the front stage imaging processing finish condition is not satisfied, a negative determination is made, and the front stage imaging processing transitions to step ST10. In step ST22, in a case where the front stage imaging processing finish condition is satisfied, a positive determination is made, and the front stage imaging processing is finished.

Next, a flow of rear stage imaging processing executed by the processing circuit 120 of the second imaging element 52 will be described with reference to FIG. 17A and FIG. 17B.

Figure 17A:
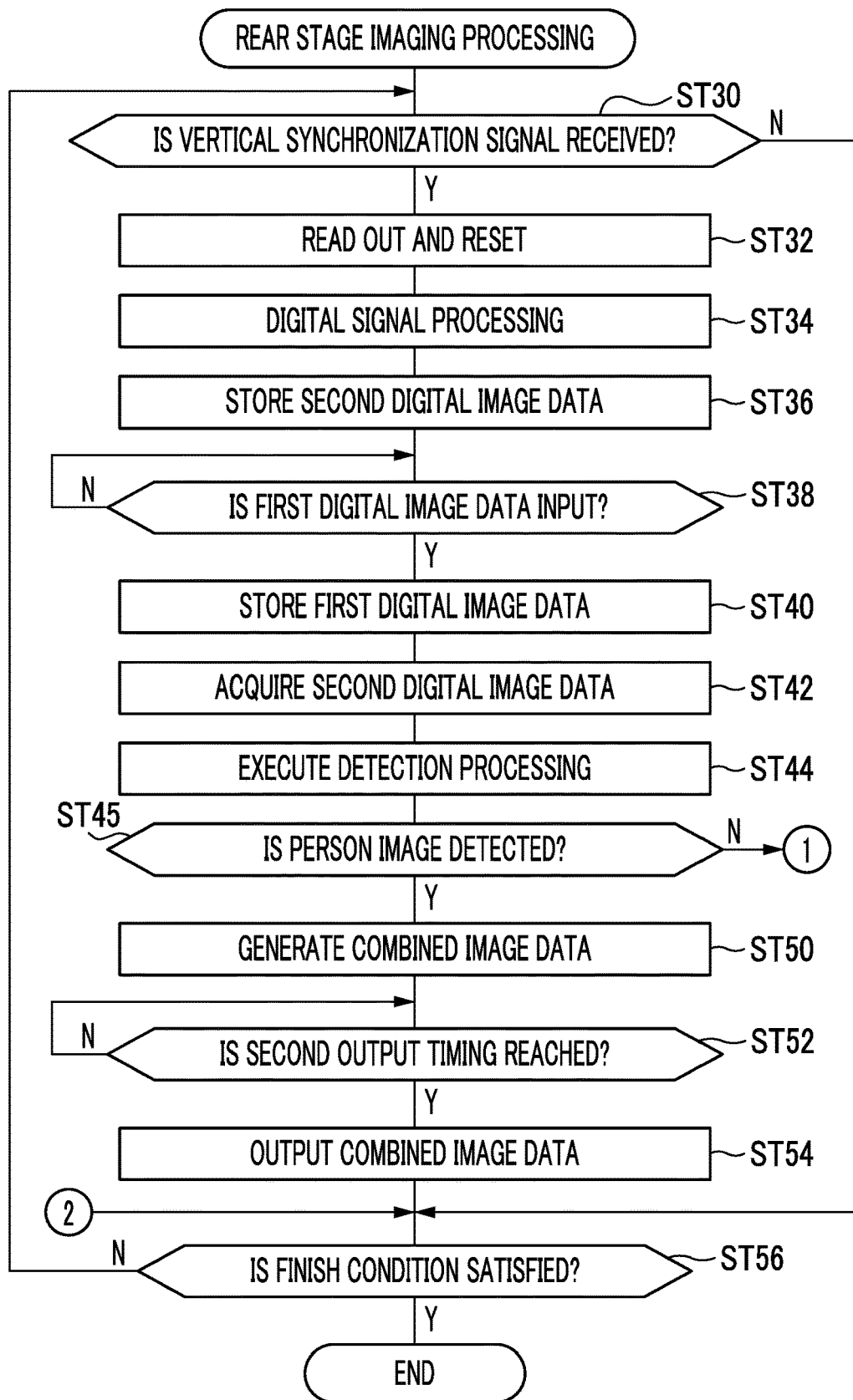
FIG. 17A is a flowchart illustrating an example of a flow of rear stage imaging processing according to the embodiment.

In the rear stage imaging processing illustrated in FIG. 17A, first, in step ST30, the control circuit 120C determines whether or not the vertical synchronization signal from the controller 15 is received by the communication I/F 120D1. In step ST30, in a case where the vertical synchronization signal from the controller 15 is not received by the communication I/F 120D1, a negative determination is made, and the rear stage imaging processing transitions to step ST56. In step ST30, in a case where the vertical synchronization signal from the controller 15 is received by the communication I/F 120D1, a positive determination is made, and the rear stage imaging processing transitions to step ST32.

In step ST32, the reading circuit 120A reads out the second analog image data 80A and resets the photoelectric conversion element 56. Then, the rear stage imaging processing transitions to step ST34.

In step ST34, the digital processing circuit 120B performs the digital signal processing on the second analog image data 80A. Then, the rear stage imaging processing transitions to step ST36.

The second digital image data 80B obtained by performing the digital signal processing on the second analog image data 80A in step ST34 is transferred to the control circuit 120C.

In step ST36, the control circuit 120C stores the second digital image data 80B in the memory 122. Then, the rear stage imaging processing transitions to step ST38.

In step ST38, the control circuit 120C determines whether or not the first digital image data 70B is input from the first imaging element 38. In step ST38, in a case where the first digital image data 70B is not input from the first imaging element 38, a negative determination is made, and the determination in step ST38 is performed again. In step ST38, in a case where the first digital image data 70B is input from the first imaging element 38, a positive determination is made, and the rear stage imaging processing transitions to step ST40.

In step ST40, the control circuit 120C stores the first digital image data 70B input in step ST38 in the memory 122. Then, the rear stage imaging processing transitions to step ST42.

In step ST42, the detection portion 120C1 acquires the second digital image data 80B from the memory 122. Then, the rear stage imaging processing transitions to step ST44.

In step ST44, the detection portion 120C1 performs the detection processing using the second digital image data 80B acquired in step ST44. Then, the rear stage imaging processing transitions to step ST45.

In step ST45, the determination portion 120C2 determines whether or not the person image is detected from the second image indicated by the second digital image data 80B by the detection processing in step ST44. In step ST45, in a case where the person image is not detected from the second image, a negative determination is made, and the rear stage imaging processing transitions to step ST46 illustrated in FIG. 17B. In step ST45, in a case where the person image is detected from the second image, a positive determination is made, and the rear stage imaging processing transitions to step ST50.

Figure 17B:
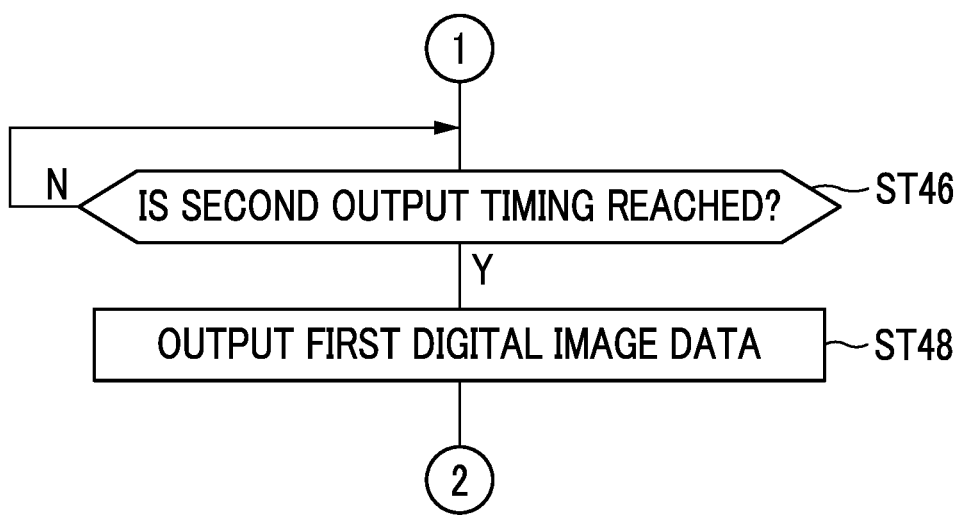
FIG. 17B is a continuation of the flowchart in FIG. 17A.

In step ST46 illustrated in FIG. 17B, the determination portion 120C2 determines whether or not a timing (second output timing) at which the first digital image data 70B is output to the signal processing circuit 34 is reached. A timing defined by the output frame rate of the second imaging element 52 is exemplified as an example of the second output timing.

In step ST46, in a case where the second output timing is not reached, a negative determination is made, and the determination in step ST46 is performed again. In step ST46, in a case where the second output timing is reached, a positive determination is made, and the rear stage imaging processing transitions to step ST48.

In step ST48, the determination portion 120C2 acquires the first digital image data 70B from the memory 122 and outputs the acquired first digital image data 70B to the signal processing circuit 34 through the communication I/F 120D3. Then, the rear stage imaging processing transitions to step ST56 illustrated in FIG. 17A.

In step ST50 illustrated in FIG. 17A, the combining portion 120C3 acquires the first digital image data 70B from the memory 122 and generates the combined image data 90 by combining the acquired first digital image data 70B with the second digital image data 80B used as the detection target of the detection processing in step ST44. Then, the rear stage imaging processing transitions to step ST52.

In step ST52, the combining portion 120C3 determines whether or not the second output timing is reached. In step ST52, in a case where the second output timing is not reached, a negative determination is made, and the determination in step ST52 is performed again. In step ST52, in a case where the second output timing is reached, a positive determination is made, and the rear stage imaging processing transitions to step ST54.

In step ST54, the combining portion 120C3 outputs the combined image data 90 generated in step ST50 to the signal processing circuit 34 through the communication I/F 120D3. Then, the rear stage imaging processing transitions to step ST56.

In step ST56, the control circuit 120C determines whether or not a condition (hereinafter, referred to as a "rear stage imaging processing finish condition") under which the rear stage imaging processing is finished is satisfied. A condition that an instruction to finish the rear stage imaging processing is received by the reception device 84 (refer to FIG. 4) is exemplified as an example of the rear stage imaging processing finish condition. In step ST56, in a case where the rear stage imaging processing finish condition is not satisfied, a negative determination is made, and the rear stage imaging processing transitions to step ST30. In step ST56, in a case where the rear stage imaging processing finish condition is satisfied, a positive determination is made, and the rear stage imaging processing is finished.

As described above, in the smart device 10, the first digital image data 70B obtained by imaging the first imaging range using the first imaging element 38 is stored in the memory 122 of the second imaging element 52. In addition, the second digital image data 80B obtained by imaging the second imaging range using the second imaging element 52 is stored in the memory 122. In the second imaging element 52, the detection processing of detecting the person image from the second image indicated by the second digital image data 80B is performed by the detection portion 120C1. Since the second image is an image having a higher resolution than the first image, the person image is detected with high accuracy, compared to a case where the person image is detected using the first image.

Here, in a case where the person image is not detected from the second image by the detection processing, the first digital image data 70B stored in the memory 122 is output to the signal processing circuit 34. In addition, in a case where the person image is detected from the second image by the detection processing, the first digital image data 70B stored in the memory 122 and the second digital image data 80B used in the detection processing are combined by the combining portion 120C3. The combined image data 90 obtained by combining the first digital image data 70B with the second digital image data 80B is output to the signal processing circuit 34.

Thus, according to the present configuration, the detection processing of detecting the person image can be performed with high accuracy, and the image data indicating the image having a resolution appropriate for the detection result of the detection processing can be output to the signal processing circuit 34, compared to a case where the first digital image data 70B is output to the signal processing circuit 34 at all times regardless of a detection result obtained by performing processing of detecting the person image using only the first image as the detection target.

In addition, in the smart device 10, the imaging ranges of the first imaging element 38 and the second imaging element 52 overlap with each other. That is, the second imaging range is included in the first imaging range. Thus, according to the present configuration, whether or not the person is present within the first imaging range can be easily specified, compared to a case where the first imaging range does not overlap with the second imaging range.

In addition, in the smart device 10, the second digital image data 80B is image data obtained by imaging performed by the second imaging element 52 with the second focal length longer than the first focal length. Thus, according to the present configuration, the person image can be detected with high accuracy, compared to a case where the person image is detected using image data obtained by imaging performed by the second imaging element 52 with the same focal length as the first focal length or a focal length shorter than the first focal length.

In addition, in the smart device 10, the second focal length is changed by the optical zoom mechanism 59. Thus, according to the present configuration, the second imaging element 52 can perform the detection processing using the second digital image data 80B obtained by imaging with various angles of view.

In addition, in the smart device 10, imaging of which the exposure amount is changeable for each frame is performed by the second imaging element 52. Thus, according to the present configuration, detection accuracy of the person image can be increased, compared to a case where an exposure amount of the second image indicated by the second digital image data 80B for each frame obtained by imaging performed by the second imaging element 52 is constant.

In addition, in the smart device 10, the aspect ratio of the second region 56B is 3:2, and the aspect ratio of the first region 42B is 16:9. Thus, according to the present configuration, a range within which the person image is detected from the second image by the detection processing can be increased, compared to a case where the aspect ratio of the second region 56B is the same 16:9 as the aspect ratio of the first region 42B.

In addition, in the smart device 10, the frame rate of the second imaging element 52 is higher than the frame rate of the first imaging element 38. Thus, according to the present configuration, the detection processing can be performed at a high speed, compared to a case where the person image is detected from the first image by the first imaging element 38.

In addition, in the smart device 10, the imaging element in which the photoelectric conversion element 56, the processing circuit 120, and the memory 122 are formed in one chip is employed as the second imaging element 52. Thus, according to the present configuration, portability of the second imaging element 52 is increased, compared to an imaging element in which the photoelectric conversion element 56, the processing circuit 120, and the memory 122 are not formed in one chip. In addition, a degree of design freedom can be increased, compared to a case of the imaging element in which the photoelectric conversion element 56, the processing circuit 120, and the memory 122 are not formed in one chip. Furthermore, it is possible to contribute to size reduction of the imaging apparatus 14, compared to a case of the imaging element in which the photoelectric conversion element 56, the processing circuit 120, and the memory 122 are not formed in one chip.

In addition, in the smart device 10, the laminated imaging element in which the photoelectric conversion element 56 is laminated with the memory 122 is employed as the second imaging element 52. Accordingly, since a wire that connects the photoelectric conversion element 56 to the memory 122 can be shortened, a wire delay can be reduced. Consequently, a transfer speed of the image data from the photoelectric conversion element 56 to the memory 122 can be increased, compared to a case where the photoelectric conversion element 56 and the memory 122 are not laminated.

In addition, improving the transfer speed contributes to high-speed processing in the entire processing circuit 120. In addition, the degree of design freedom can be increased, compared to a case of not laminating the photoelectric conversion element 56 and the memory 122. Furthermore, it is possible to contribute to size reduction of the imaging apparatus 14, compared to a case of not laminating the photoelectric conversion element 56 and the memory 122.

In addition, in the smart device 10, the live view image or the like based on the image data output from the second imaging element 52 is displayed on the display 26 by the CPU 15A. Thus, according to the present configuration, the live view image or the like based on the image data output from the second imaging element 52 can be visible to the user.

In addition, in the smart device 10, the image data output from the second imaging element 52 is stored in the storage 15B, the smart device, the personal computer, the server, the USB memory, and/or the memory card or the like by the CPU 15A. Thus, according to the present configuration, the image data output from the second imaging element 52 can be managed.

Figure 21:
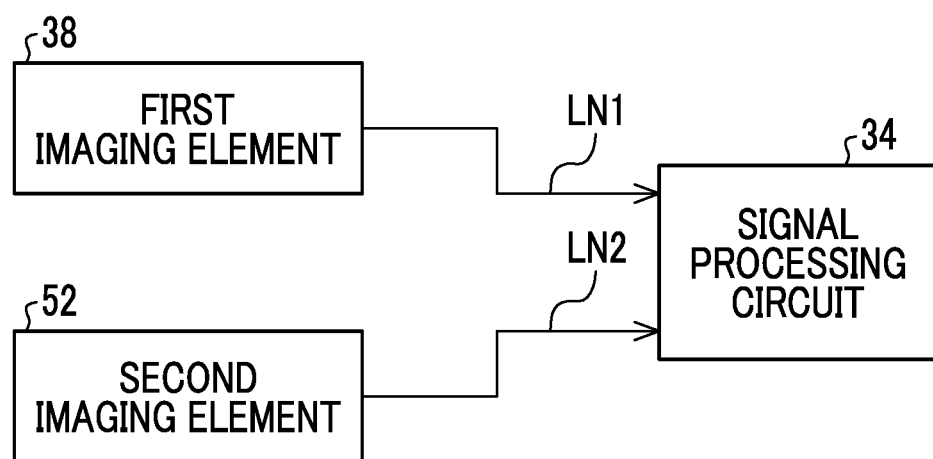
FIG. 21 is a conceptual diagram illustrating an example of an aspect in which the first imaging element and the second imaging element are connected to a signal processing circuit using a connection method according to the technology of the related art.

FIG. 21 illustrates an example of a form in which the first imaging element 38 is directly connected to the signal processing circuit 34 through a communication line LN1, and the second imaging element 52 is directly connected to the signal processing circuit 34 through a communication line LN2. In the example illustrated in FIG. 21, in a case where the first imaging element 38 and the second imaging element 52 are connected to the signal processing circuit 34, an interface corresponding to each of the first imaging element 38 and the second imaging element 52 is necessary in the signal processing circuit 34. Thus, the number of wires is increased, compared to a case where only a single imaging element is connected to the signal processing circuit 34.

Meanwhile, in the smart device 10, the first imaging element 38, the second imaging element 52, and the signal processing circuit 34 are connected in series, and the first digital image data 70B is output to the second imaging element 52 from the first imaging element 38. The first digital image data 70B and the combined image data 90 are selectively output to the signal processing circuit 34 from the second imaging element 52. Thus, according to the present configuration, the number of wires necessary for connecting the first imaging element 38 and the second imaging element 52 to the signal processing circuit 34 can be suppressed, compared to a case where the first imaging element 38 is directly connected to the signal processing circuit 34 through the communication line LN1, and the second imaging element 52 is directly connected to the signal processing circuit 34 through the communication line LN2 (refer to FIG. 21).

In the embodiment, while an example of a form in which the combined image data 90 is output to the signal processing circuit 34 from the second imaging element 52 is illustratively described, the technology of the present disclosure is not limited thereto. For example, instead of the combined image data 90, the second digital image data 80B may be output to the signal processing circuit 34 from the second imaging element 52. Alternatively, the image data (for example, image data obtained by processing the second digital image data 80B) based on the second digital image data 80B may be output to the signal processing circuit 34 from the second imaging element 52. Here, not only the second digital image data 80B but also the image data based on the second digital image data 80 are also an example of the "second image data" according to the embodiment of the technology of the present disclosure.

Figure 18:
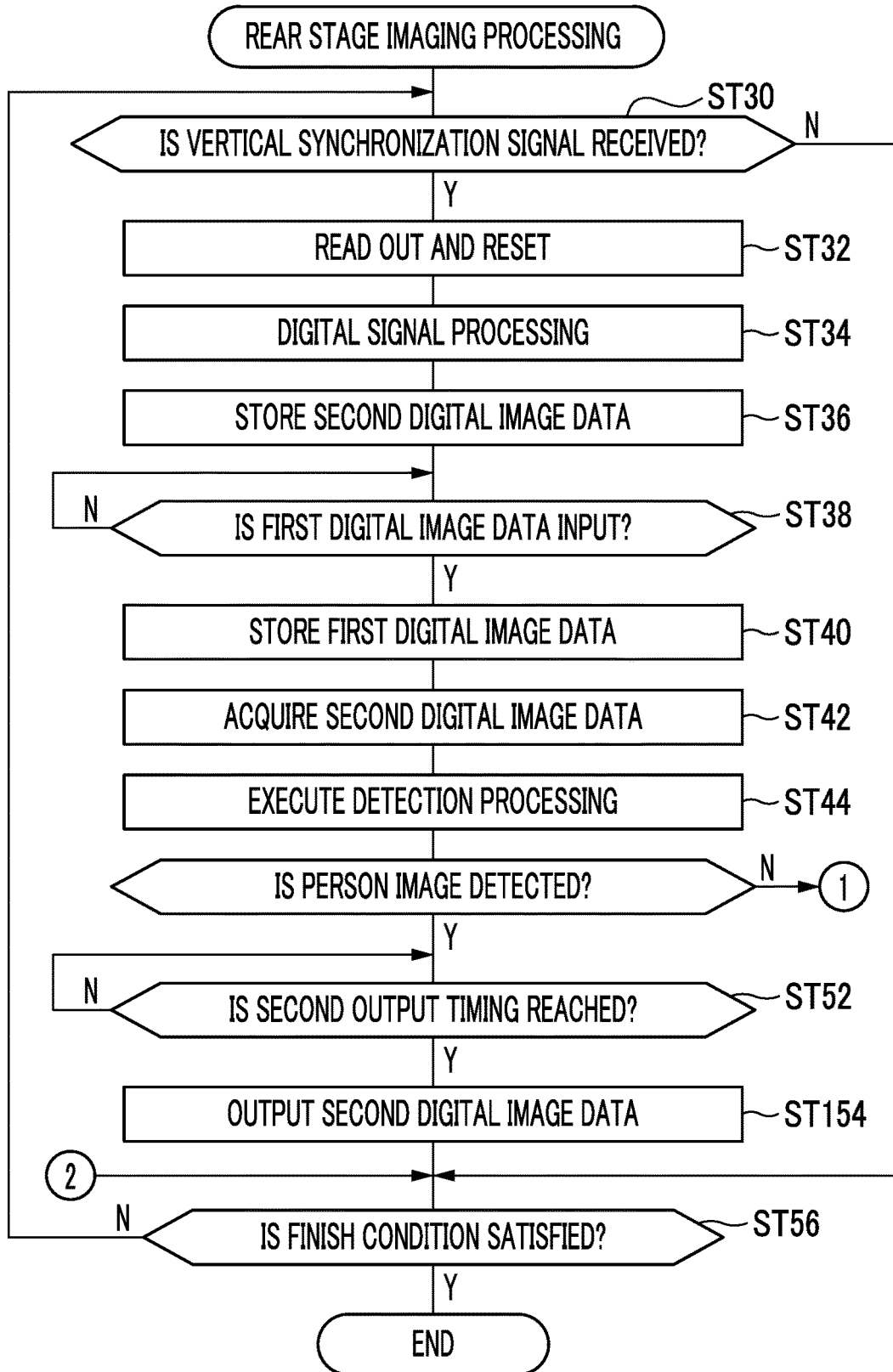
FIG. 18 is a flowchart illustrating a modification example of the flow of rear stage imaging processing according to the embodiment.

In a case where the second digital image data 80B is output instead of the combined image data 90, as illustrated in FIG. 18 as an example, in the rear stage imaging processing, processing in step ST52 illustrated in FIG. 17A is not necessary, and processing in step ST154 is performed by the control circuit 120C instead of processing in step ST54 illustrated in FIG. 17A. That is, in step ST154, the second digital image data 80B used in the detection processing in step ST44 is output to the signal processing circuit 34 by the control circuit 120C.

In a case where the second digital image data 80B is output to the signal processing circuit 34 instead of the combined image data 90, an image based on the second digital image data 80B may be displayed on the display 26, or the second digital image data 80B may be stored in a storage device such as the storage 15B under control of the CPU 15A of the controller 15.

In addition, in the embodiment, while an example of a form in which the detection portion 120C1 acquires the second digital image data 80B from the memory 122 is illustratively described, the technology of the present disclosure is not limited thereto. For example, the second digital image data 80B may be used by the detection portion 120C1 without being stored in the memory 122. That is, the second digital image data 80B may be processed by the control circuit 120C without being stored in the memory 122.

In addition, in the embodiment, while the imaging element in which the photoelectric conversion element 56, the processing circuit 120, and the memory 122 are formed in one chip is illustrated as the second imaging element 52, the technology of the present disclosure is not limited thereto. For example, at least the photoelectric conversion element 56 and the memory 122 among the photoelectric conversion element 56, the processing circuit 120, and the memory 122 may be formed in one chip.

In addition, in the embodiment, while an example of a form in which the first digital image data 70B or the combined image data 90 is selectively output in accordance with the detection result of the detection processing is illustratively described, the technology of the present disclosure is not limited thereto. For example, the second digital image data 80B may be output to the signal processing circuit 34 from the second imaging element 52 regardless of the detection result of the detection processing.

Figure 19:
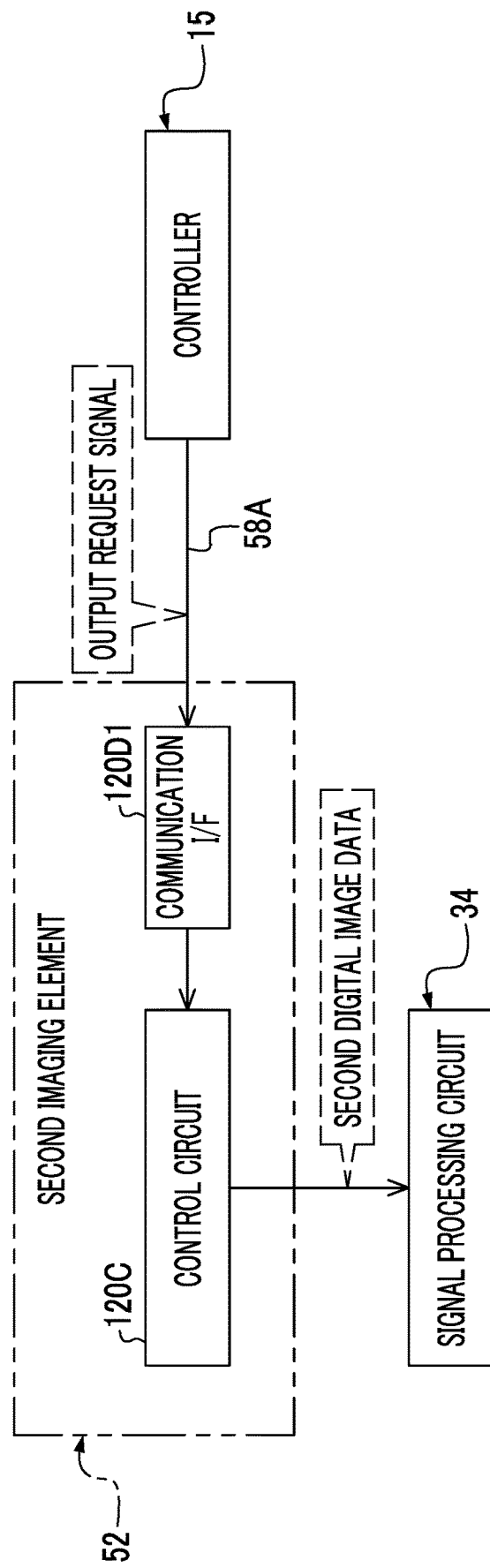
FIG. 19 is a block diagram illustrating a modification example of the functions of the second imaging element according to the embodiment.

In this case, for example, as illustrated in FIG. 19, the controller 15 outputs an output request signal for requesting output of the second digital image data 80B to the signal processing circuit 34 regardless of the detection result of the detection processing, to the second imaging element 52 through the communication line 58A. In the second imaging element 52, the output request signal is received by the communication I/F 120D1. Here, the communication I/F 120D1 is an example of a "reception portion (acceptor)" according to the embodiment of the technology of the present disclosure.

In a case where the output request signal is received by the communication I/F 120D1, the control circuit 120C outputs the second digital image data 80B to the signal processing circuit 34 regardless of the detection result of the detection processing. According to the present configuration, it is possible to contribute to improving convenience of the user desiring to output the second digital image data 80B regardless of the detection result of the detection processing.

In addition, in the embodiment, while the laminated imaging element is illustrated as the first imaging element 38, the technology of the present disclosure is not limited thereto. The first imaging element 38 may be a non-laminated imaging element. In this case, instead of the first imaging apparatus 30, a first imaging apparatus including the non-laminated imaging element and a processing circuit that generates the first digital image data 70B from the first analog image data 70A obtained by the non-laminated imaging element and outputs the generated first digital image data 70B to the second imaging element 52 may be applied. Alternatively, in a case of using the non-laminated imaging element as the first imaging element 38, for example, the first analog image data 70A may be output to the second imaging element 52 from the first imaging element 38, and the first digital image data 70B may be generated by digitizing the first analog image data 70A using the second imaging element 52.

In addition, in the embodiment, while the communication I/Fs are connected in accordance with the PCIe connection standard, the technology of the present disclosure is not limited thereto. Instead of the PCIe connection standard, other connection standards such as LVDS, SATA, SLVS-EC, or MIPI may be employed.

In addition, in the embodiment, all of communication between the second imaging element 52 and the signal processing circuit 34, communication between the controller 15 and the first imaging element 38, communication between the controller 15 and the second imaging element 52, and communication between the signal processing circuit 34 and the controller 15 are wired communication. However, the technology of the present disclosure is not limited thereto. Communication between the second imaging element 52 and the signal processing circuit 34, communication between the controller 15 and the first imaging element 38, communication between the controller 15 and the second imaging element 52, and/or communication between the signal processing circuit 34 and the controller 15 may be wireless communication.

In addition, in the embodiment, while an example of a form of incorporating the UI system device 17 in the smart device 10 is illustratively described, at least a part of a plurality of constituents included in the UI system device 17 may be externally attached to the smart device 10. In addition, at least a part of the plurality of constituents included in the UI system device 17 may be used as being connected to the external I/F 104 as a separate body.

In addition, in the embodiment, while the device including the ASIC and the FPGA is illustrated as the processing circuit 120, the technology of the present disclosure is not limited thereto. The processing circuit 120 may be implemented by a software configuration using a computer.

Figure 20:
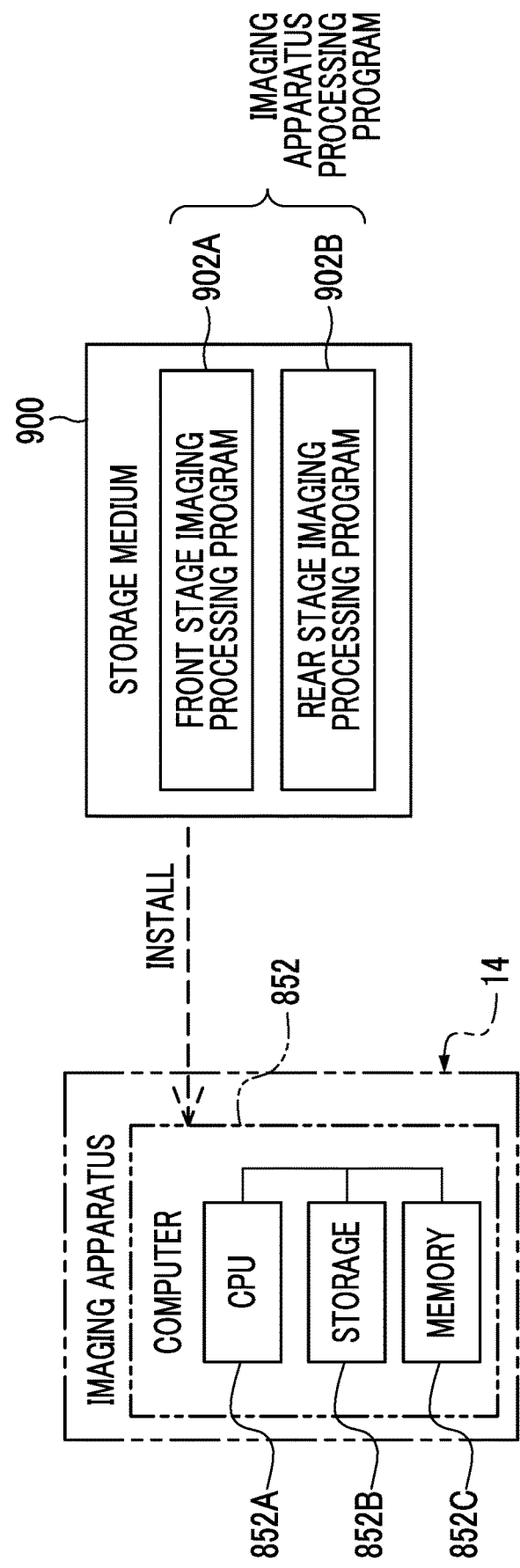
FIG. 20 is a conceptual diagram illustrating an example of an aspect in which a front stage imaging processing program and a rear stage imaging processing program are installed on a computer in the imaging apparatus from a storage medium storing the front stage imaging processing program and the rear stage imaging processing program.

In this case, for example, as illustrated in FIG. 20, a computer 852 is incorporated in the imaging apparatus 14. For example, the computer 852 is incorporated in the second imaging element 52 instead of the processing circuit 120. A front stage imaging processing program 902A causing the computer 852 to execute the front stage imaging processing according to the embodiment is stored in a storage medium 900. In addition, a rear stage imaging processing program 902B causing the computer 852 to execute the rear stage imaging processing according to the embodiment is stored in the storage medium 900. Any portable storage medium such as an SSD or a USB memory that is a non-temporary storage medium is exemplified as an example of the storage medium 900.

Hereinafter, for convenience of description, the front stage imaging processing and the rear stage imaging processing will be referred to as "imaging apparatus processing" unless otherwise necessary to distinguish therebetween. The front stage imaging processing program 902A and the rear stage imaging processing program 902B will be referred to as an "imaging apparatus processing program" unless otherwise necessary to distinguish therebetween.

The computer 852 comprises a CPU 852A, a storage 852B, and a memory 852C. The storage 852B is a non-volatile storage device such as an EEPROM, and the memory 852C is a volatile storage device such as a RAM. An imaging apparatus processing program 902 stored in the storage medium 900 is installed on the computer 852. The CPU 852A executes the imaging apparatus processing in accordance with the imaging apparatus processing program 902.

The imaging apparatus processing program 902 may be stored in the storage 852B instead of the storage medium 900. In this case, the CPU 852A reads out the imaging apparatus processing program 902 from the storage 852B and executes the read imaging apparatus processing program 902 in the memory 852C. In such a manner, the imaging apparatus processing is implemented by executing the imaging apparatus processing program 902 using the CPU 852A.

In addition, the imaging apparatus processing program 902 may be stored in a storage portion of another computer, a server apparatus, or the like connected to the computer 852 through a communication network (not illustrated), and the imaging apparatus processing program 902 may be downloaded to the computer 852 in response to a request from the smart device 10 and be installed on the computer 852.

The entire imaging apparatus processing program 902 does not need to be stored in the storage portion of the other computer, the server apparatus, or the like connected to the computer 852 or the storage 852B. A part of the imaging apparatus processing program 902 may be stored.

In the example illustrated in FIG. 20, while an example of a form of incorporating the computer 852 in the imaging apparatus 14 is illustrated, the technology of the present disclosure is not limited thereto. For example, the computer 852 may be disposed on an outside of the imaging apparatus 14.

In the example illustrated in FIG. 20, the CPU 852A may be a single CPU or include a plurality of CPUs. In addition, a GPU may be applied instead of the CPU 852A.

In the example illustrated in FIG. 20, while the computer 852 is illustrated, the technology of the present disclosure is not limited thereto. A device including an ASIC, an FPGA, and/or a PLD may be applied instead of the computer 852. In addition, a combination of a hardware configuration and a software configuration may be used instead of the computer 852.

Various processors illustrated below can be used as a hardware resource for executing the imaging apparatus processing described in the embodiment. For example, a CPU that is a general-purpose processor functioning as the hardware resource for executing the imaging apparatus processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor. A memory is incorporated in or connected to any of the processors, and any of the processors executes the imaging apparatus processing using the memory.

The hardware resource for executing the imaging apparatus processing may be configured with one of those various processors or may be configured with a combination of two or more processors of the same type or different types (for example, a combination of a plurality of FPGAs or a combination of a CPU and an FPGA). In addition, the hardware resource for executing the imaging apparatus processing may be one processor.

As an example of a configuration with one processor, first, a form in which one processor is configured with a combination of one or more CPUs and software, and in which this processor functions as the hardware resource for executing the imaging apparatus processing is available. Second, as represented by an SoC or the like, a form of using a processor that implements, by one IC chip, a function of the entire system including a plurality of hardware resources for executing the imaging apparatus processing is available. In such a manner, the imaging apparatus processing is implemented using one or more of the various processors as the hardware resource.

Furthermore, as a hardware structure of those various processors, more specifically, an electric circuit in which circuit elements such as semiconductor elements are combined can be used. In addition, the imaging apparatus processing is merely an example. Accordingly, unnecessary steps may be deleted, new steps may be added, or a processing order may be rearranged without departing from a gist of the technology of the present disclosure.

In addition, while the smart device 10 is illustrated in the example illustrated in FIG. 1, the technology of the present disclosure is not limited thereto. That is, the technology of the present disclosure can be applied to various electronic apparatuses (for example, an interchangeable lens camera, a fixed lens camera, a personal computer, and/or a wearable terminal apparatus or the like) incorporating the imaging apparatus 14. Even with these electronic apparatuses, the same action and effect as the smart device 10 are obtained. In addition, in the embodiment, while an example of a form in which the first imaging apparatus 30 and the second imaging apparatus 32 are accommodated in the housing 12 as the imaging apparatus 14 is illustratively described, both of the first imaging apparatus 30 and the second imaging apparatus 32 do not need to be accommodated in the housing 12. For example, both of the first imaging apparatus 30 and the second imaging apparatus 32 may be used as two cameras outside the housing 12. Even in this case, the same actions and effects as the imaging apparatus 14 are obtained.

In addition, while the display 26 is illustrated in the embodiment, the technology of the present disclosure is not limited thereto. For example, a separate display that is retrofit into the imaging apparatus may be used as the "display portion (display)" according to the embodiment of the technology of the present disclosure.

In addition, in the embodiment, while two imaging elements of the first imaging element 38 and the second imaging element 52 are illustrated, the technology of the present disclosure is not limited thereto. Three or more imaging elements may be applied. An image obtained by imaging performed by one imaging element (specific imaging element) among the three or more imaging elements has a higher resolution than images obtained by imaging performed by the other imaging elements and is used in the detection processing. In addition, it is preferable that the specific imaging element is the laminated imaging element. In the specific imaging element, in a case where the specific subject image (for example, the person image) is detected by the detection processing, the combined image data indicating a combined image obtained by combining the image obtained by imaging performed by the specific imaging element with the image obtained by imaging performed by at least one of the remaining imaging elements is output by the specific imaging element.

Even in this case, the three or more imaging elements may be connected in series in the same manner as serial connection between the first imaging element 38 and the second imaging element 52. In addition, in a case of using the three or more imaging elements, the resolutions of the images obtained by imaging performed by the imaging elements may be different from each other. The detection processing may be performed in an order from the image having the lowest resolution to the image having the highest resolution (stepwise) among the images other than the image having the lowest resolution. In a case where the specific subject image is detected by the detection processing, the combined image data obtained by combining an image (for example, an image including the specific subject image) obtained by imaging performed by the imaging element in which the detection processing of the specific subject image is performed, with an image obtained by imaging performed by the imaging element that obtains an image having a lower resolution than the imaging element in which the detection processing is performed may be output to a rear stage circuit (for example, the signal processing circuit 34). In addition, image data indicating the image including the specific subject image may be output instead of the combined image data.

Above described contents and illustrated contents are detailed description for parts according to the embodiment of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendix is further disclosed with respect to the embodiment.

APPENDIX

An imaging apparatus including a first imaging element that outputs first image data obtained by imaging a subject to a rear stage imaging element, and a second imaging element that is disposed as the rear stage imaging element and includes a memory which stores the first image data output from the first imaging element, and a control circuit which processes second image data obtained by imaging the subject using the second imaging element, in which a second image indicated by the second image data has a higher resolution than a first image indicated by the first image data, the control circuit performs detection processing of detecting a specific subject image indicating a specific subject from the second image, and the second imaging element outputs the first image data stored in the memory to a specific output destination in a case where the specific subject image is not detected by the detection processing, and outputs the second image data or combined image data obtained by combining the first image data with the second image data using the control circuit to the output destination in a case where the specific subject image is detected by the detection processing.

What is claimed is:
1. An imaging apparatus comprising:
   a first imaging element that outputs first image data obtained by imaging a subject; and
   a second imaging element that includes a memory which stores the first image data output from the first imaging element, and a control circuit which processes second image data obtained by imaging the subject using the second imaging element,
   wherein a second image indicated by the second image data has a higher resolution than a first image indicated by the first image data,
   wherein the control circuit performs detection processing of detecting a specific subject image indicating a specific subject from the second image, and
   wherein the second imaging element outputs the second image data or combined image data obtained by combining the first image data with the second image data using the control circuit in a case in which the specific subject image is detected by the detection processing.
2. The imaging apparatus according to claim 1,
   wherein imaging ranges of the first imaging element and the second imaging element overlap with each other.
3. The imaging apparatus according to claim 1,
   wherein the first image data is first focal length image data obtained by imaging performed by the first imaging element with a first focal length that is one of the first focal length or a second focal length that is longer than the first focal length, and
   wherein the second image data is second focal length image data obtained by imaging performed by the second imaging element with the second focal length.
4. The imaging apparatus according to claim 3,
   wherein the second focal length is changed by an optical zoom mechanism.
5. The imaging apparatus according to claim 1,
   wherein the second imaging element performs imaging of which an exposure amount is changeable in accordance with a frame.
6. The imaging apparatus according to claim 1,
   wherein the first imaging element includes a first photoelectric conversion element on which an image of first subject light is formed,
   wherein the second imaging element includes a second photoelectric conversion element on which an image of second subject light is formed, wherein the first image data is image data obtained from a first region designated in the first photoelectric conversion element, wherein the second image data is image data obtained from a second region designated in the second photoelectric conversion element, and wherein the second region is a region that is wider than the first region.

7. The imaging apparatus according to claim 1, further comprising:

a communication interface that receives a request for output of the second image data, wherein in a case in which the request is received by the communication interface, the second imaging element outputs the second image data regardless of a detection result of the detection processing.

8. The imaging apparatus according to claim 1, wherein a frame rate of the second imaging element is higher than a frame rate of the first imaging element.

9. The imaging apparatus according to claim 1, wherein the second imaging element is an imaging element in which at least a photoelectric conversion element and the memory are formed in one chip.

10. The imaging apparatus according to claim 9, wherein the second imaging element is a laminated imaging element in which the photoelectric conversion element is laminated with the memory.

11. The imaging apparatus according to claim 1, wherein the first imaging element and the second imaging element are connected in series, and wherein the first imaging element outputs the first image data to the second imaging element.

12. The imaging apparatus according to claim 1, further comprising:

a processor configured to perform at least one of control for displaying at least one of an image based on the first image data output by the second imaging element or an image based on the second image data or the combined image data output by the second imaging element on a display, or control for storing at least one of the first image data output by the second imaging element or the second image data or the combined image data output by the second imaging element in a storage device.

13. An operation method of an imaging apparatus, the operation method comprising:

outputting first image data obtained by imaging a subject using a first imaging element included in the imaging apparatus;

storing the first image data output from the first imaging element in a memory included in a second imaging element disposed in the imaging apparatus;

processing second image data obtained by imaging the subject using the second imaging element;

performing detection processing of detecting a specific subject image indicating a specific subject from a second image indicated by the second image data by the second imaging element; and outputting the second image data or combined image data obtained by combining the first image data with the second image data by the second imaging element in a case in which the specific subject image is detected by the detection processing, wherein the second image has a higher resolution than a first image indicated by the first image data.

14. A non-transitory computer-readable storage medium storing a program executable by a computer applied to an imaging apparatus to perform a process comprising:

outputting first image data obtained by imaging a subject using a first imaging element included in the imaging apparatus;

storing the first image data output from the first imaging element in a memory included in a second imaging element disposed in the imaging apparatus;

processing second image data obtained by imaging the subject using the second imaging element;

performing detection processing of detecting a specific subject image indicating a specific subject from a second image indicated by the second image data by the second imaging element; and outputting the second image data or combined image data obtained by combining the first image data with the second image data by the second imaging element in a case in which the specific subject image is detected by the detection processing, wherein the second image has a higher resolution than a first image indicated by the first image data.

* * * * *